(12) United States Patent
Chu et al.

(10) Patent No.: US 11,163,798 B1
(45) Date of Patent: *Nov. 2, 2021

(54) DATABASE REPLICATION TO REMOTE DEPLOYMENT WITH AUTOMATED FULFILLMENT

(71) Applicant: Snowflake Inc., Bozeman, MT (US)

(72) Inventors: Pui Kei Johnston Chu, Richmond Hill (CA); Benoit Dageville, San Mateo, CA (US); Shreyas Narendra Desai, Bellevue, WA (US); Sameer Deshpande, Mountain View, CA (US); Subramanian Muralidhar, Mercer Island, WA (US); Di Wu, Newark, CA (US)

(73) Assignee: Snowflake Inc., Bozeman, MT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/302,397

(22) Filed: Apr. 30, 2021

Related U.S. Application Data

(60) Provisional application No. 63/200,668, filed on Mar. 21, 2021.

(51) Int. Cl.
*G06F 16/00* (2019.01)
*G06F 16/27* (2019.01)
*G06F 16/182* (2019.01)

(52) U.S. Cl.
CPC ........ *G06F 16/273* (2019.01); *G06F 16/1844* (2019.01)

(58) Field of Classification Search
CPC ............................ G06F 16/273; G06F 16/1844
(Continued)

(56) References Cited

U.S. PATENT DOCUMENTS

2005/0071195 A1* 3/2005 Cassel .................. G16H 10/60
705/2
2007/0033154 A1 2/2007 Trainum et al.
(Continued)

OTHER PUBLICATIONS

"U.S. Appl. No. 17/302,396, Notice of Allowance dated Jul. 28, 2021", 22 pgs.
(Continued)

*Primary Examiner* — Chelcie L Daye
(74) *Attorney, Agent, or Firm* — Schwegman Lundberg & Woessner, P.A.

(57) ABSTRACT

Disclosed herein are systems and methods for database replication to a remote deployment with automated fulfillment. In an embodiment, a data platform detects receipt of a database-replication request associated with a data consumer, requesting availability of a local instance of a primary-deployment database in a remote-deployment account of a data provider at a remote deployment of the data platform. The data platform responsively performs remote-deployment-activation operations including provisioning the remote-deployment account with a set of one or more replication-preparation objects associated with the primary-deployment database, and also including invoking at least one refresh command with respect to the set of one or more replication-preparation objects, which makes available to the data consumer a local instance of the primary-deployment database in the remote-deployment account of the data provider at the remote deployment of the data platform.

23 Claims, 11 Drawing Sheets

(58) Field of Classification Search
USPC .................................................. 707/613, 610
See application file for complete search history.

(56) References Cited

U.S. PATENT DOCUMENTS

2011/0231831 A1    9/2011   Smith et al.
2018/0004829 A1*   1/2018   Kathuria ................. G06F 16/27
2020/0012659 A1*   1/2020   Dageville ............. G06F 16/273
2020/0342025 A1    10/2020  Bhargava et al.

OTHER PUBLICATIONS

"U.S. Appl. No. 17/302,396, Notice of Allowance dated Aug. 27, 2021", 20 pgs.

* cited by examiner

DATABASE REPLICATION TO REMOTE DEPLOYMENT WITH AUTOMATED FULFILLMENT

CROSS-REFERENCE TO RELATED APPLICATIONS

This application claims the benefit of U.S. Provisional Patent Application No. 63/200,668, filed Mar. 21, 2021 and entitled "Methods and Systems for Replication of Data to Remote Deployment via Automated Fulfillment," the entirety of which is hereby incorporated herein by reference. This application also incorporates by reference the entirety of a U.S. patent application being filed on even date herewith, entitled "Database Replication to Remote Deployment with Automated Fulfillment" and bearing Ser. No. 17/302,396.

TECHNICAL FIELD

The present disclosure relates to data platforms, data providers, data consumers, automated fulfillment, multiple deployments, primary deployments, remote deployments, replication, and, more particularly, to systems and methods for database replication to a remote deployment with automated fulfillment.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, the data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth.

In an implementation of a data platform, a given database (e.g., a database maintained for a customer account) may reside as an object within, e.g., a customer account, which may also include one or more other objects (e.g., users, roles, privileges, and/or the like). Furthermore, a given object such as a database may itself contain one or more objects such as schemas, tables, materialized views, and/or the like. A given table may be organized as a collection of records (e.g., rows) that each include a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

BRIEF DESCRIPTIONS OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
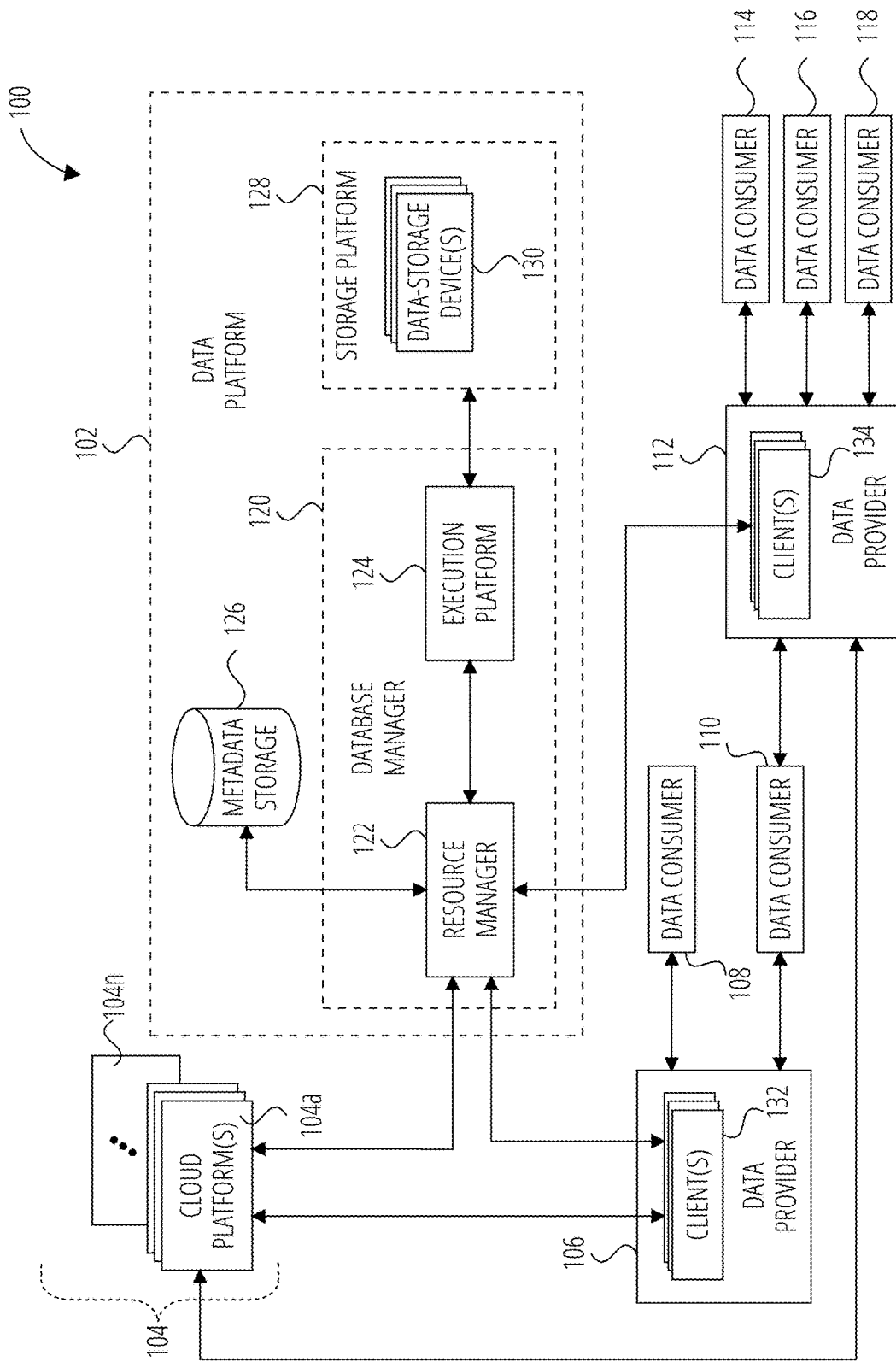
FIG. 1 illustrates an example communication context—in which at least one embodiment could be performed, deployed, and/or the like—that includes an example data platform, multiple example data providers, and multiple example data consumers.

Some data-platform implementations include not only a first (e.g., primary, initial, etc.) deployment, but also include one or more additional deployments around the globe and perhaps beyond. In the present disclosure, that first deployment is generally referred to as the "primary deployment" of the data platform, and each of the additional deployments is generally referred to herein as being a "remote deployment." These terms are used mainly to distinguish the deployments from one another, and some data platforms may use different terminology and/or have different interrelationships among multiple deployments. In some instances, a data platform may delineate a country, the world, etc. into a number of regions. In some arrangements, one of the regions includes the primary deployment and may also include one or more remote deployments. Additionally, each of the other regions may include one or more remote deployments.

Moreover, it is often the case that data providers are direct customers of a data platform. As examples, data providers may provide one or more types of data such as financial data (e.g., stock prices), weather data, pandemic test results, vaccination levels, and/or the like. These data providers typically have one or more customers of their own that consume the data; these entities are referred to in the present disclosure as "data consumers." One example of a data consumer might be a trading house that consumes financial data from a data provider.

It is recognized that there is nothing stopping a data consumer from also or instead being a direct customer of a data platform, and nothing to stop data providers from also acting as data consumers with respect to certain data, but for clarity of presentation, the arrangements that form the backdrop for most of the examples that are described herein stick to the hierarchy of a data platform serving one or more data providers, and each of those data providers serving one or more data consumers.

It may occur from time to time that a data consumer makes a request of a data provider that the data provider instantiate a synced replica of one or more databases in a place that is geographically and/or network-topologically closer to the data consumer than the instantiation of that particular data that the data consumer was previously using. In other cases, a data provider may take on a new data consumer as a customer where part of the arrangement is that the data consumer is requesting that the data provider instantiate a remote deployment of a given database. It is further noted that, although there certainly could be many examples in which a given remote deployment involves multiple databases, one-database examples are primarily described in the present disclosure for simplicity.

Currently, data providers handle requests for remote deployments from their data-consumer customers in a number of different ways. One approach is to essentially do nothing, wait to receive such a request from a data consumer, and then manually set up the related resources in the remote location, perhaps with assistance from personnel at the data platform as well. In some cases, the data platform may already have an instantiation there, in which case they may be able to just make that instantiation available to the requesting data consumer by way of the relevant data provider. There are many times, however, when the particular data platform does not have a current instantiation of the relevant database in the requested location. Requests for remote deployments may initiate with data consumers or data providers, and may be communicated to a given data platform by either.

In this wait-and-then-act approach, the data provider would then typically manually configure a remote instance of the relevant database in the requested region, and set up supplementary resources such as one or more accounts, one or more shares, one or more tasks and/or other processes for refreshing the data, and the like. Another approach that is used in some current implementations could be characterized as an act-instead-of-waiting approach in which a data platform may attempt to anticipate such requests in connection with various regions, and set up fully syncing database instances and all of the supporting objects even before any data-consumer has ever asked for such data to be available in a given region. This approach is costly in terms of time and effort, and also directly monetarily costly due to charges such as data-storage charges, data-egress charges, and the like.

Thus, among other shortcomings, the wait-and-then-(re) act approach causes delay between the time that the data consumer makes the request (and/or the time when their data provider relays that request to the data platform) and the time that the data platform completes the manual process described above—it is a request-and-then-wait situation for the data consumer. Not only does this take time, but it is also prone to human error. Moreover, many data providers may view this manual replication as not only expensive but also potentially as somewhat confusing and perhaps even a bit intimidating. On the other hand, there are not many data providers that are in a hurry to start paying data-storage charges, data-egress charges, and/or the like in a situation in which they have yet to even receive a request indicating that a data consumer wants that data to be available there. Furthermore, all other things being equal, data providers typically prefer to not have data sitting out in remote deployments if there is no current business reason for that data to be there. It is a security risk in addition to it being expensive. Data providers for the most part prefer to have data only where they need it, and only while they need it there.

To address these and other issues with and shortcomings of prior implementations, disclosed herein are various embodiments of systems and methods for database replication to a remote deployment with automated fulfillment. As used herein, "fulfillment" is a term that generally relates to performing one or more tasks as requested by, for example, a data-consumer customer of a data provider, which in various embodiments is a direct customer of a data platform, as described above. A specific though non-limiting example of fulfillment in the context of the present disclosure is achieving what a data-consumer customer requests with regard to database replication in remote deployments of the data platform. More generally, fulfillment may be defined as getting data where it needs to be when it needs to be there.

While embodiments of the present disclosure are described in further detail below in connection with the various figures, it is briefly explained here that at least some embodiments involve provisioning a remote account of a data provider—a type of account that is referred to herein at times as a "remote-deployment account," a "remote-deployment account of a data provider," a "data-provider remote account," and the like—with various objects. Some examples of such objects include those that are referred to herein as a "shell database," a "shell share," and a set of one or more "tasks" or "task objects." Furthermore, in at least one embodiment, the remote-deployment account—of a data provider at the remote deployment of the data platform—is a limited-privileges account in that it is used and useful only for database and share replication and refreshing in accordance with embodiments of the present disclosure.

As mentioned above, in at least one embodiment, a set of one or more tasks—one task is used here by way of example—is installed in the data-provider remote account to perform a number of functions. One such function is to periodically check whether a request for replication of the database—that corresponds to the shell database and shell share—has been received at the data-provider remote account from a data-consumer customer of that data provider. If so, the task is further configured to initiate what are referred to herein as "refresh" commands with respect to both the shell database and the shell share. In at least one embodiment, the invoking of these commands causes syncing to begin between the primary instance of the database in the data provider's account in the primary deployment of the data platform. That account is referred to herein at times as the "data-provider primary account," and by other names in a manner similar to that described above with respect to remote-deployment accounts.

As a result of the invoking of a refresh command, what were a shell database and a shell share are now a populated and functioning database and an operating share in the data-provider remote account at the remote deployment. The data provider can then "share the share" with their data-consumer customer, which in at least one embodiment enables that data-consumer customer to then access the remote-deployment instance of the database. Shares are described more fully throughout the present disclosure, but briefly, in at least one embodiment, a share is an object that contains a pointer to a database; the share can be thought of as a wrapper or a container around the database. A share itself can be populated with multiple objects, and the share can be shared with various users, which grants those users access to those objects until a terminating event occurs such as the data-consumer customer dropping the share, the data provider revoking the share (with respect to that customer), and/or the like.

It is also noted here that the terms "replication" and "refresh" (and similar forms such as "replicating," "refreshing," etc.) are used throughout the present disclosure. Generally speaking, "refresh" and its various forms are used to refer to a command or instruction that causes a shell database and shell share to start receiving one-way syncing (e.g., "pushed" updates). And "replicate" and its various forms are used in a few different ways. In some cases, the "replicate" terms are used as a precursor to the "refresh" terms, where the "replicate" terms refer to the prepatory provisioning (populating, storing, etc.) of the above-described shell-type objects (e.g., shell database, shell share, etc.), in some cases along with one or task objects as described herein. When used in that manner, the "replicate" terms can be analogized to putting up scaffolding for a building, and the "refresh" terms can be analogized to actually putting up the building.

The "replicate" terms are also used in another way herein—in those cases, the terms are used as a general label for what a data consumer may request (e.g., via their data provider) when the data consumer wishes to have made available to them a local instance of a given database at a given remote-deployment account of their data provider; that is, the data consumer may request "replication" of a given database to a given remote deployment, and a data platform may responsively perform operations such as the more technical "replicate" operations (putting up the scaffolding) and "refresh" operations (building, populating, filling in, etc.) that are also described herein.

One embodiment takes the form of a method that is performed by a data platform executing instructions on at least one hardware processor. The data platform provisions a remote-deployment account of a data provider at a remote deployment of the data platform with a set of one or more replication-preparation objects associated with a primary-deployment database that is resident in a primary-deployment account of the data provider at a primary deployment of the data platform. The data platform detects receipt, after the provisioning, of a database-replication request associated with a data consumer, requesting availability to the data consumer of a local instance of the primary-deployment database in the remote-deployment account of the data provider at the remote deployment of the data platform. The data platform performs one or more remote-deployment-activation operations in response to detecting receipt of the database-replication request. The performing of the one or more remote-deployment-activation operations makes available to the data consumer a local instance of the primary-deployment database in the remote-deployment account of the data provider at the remote deployment of the data platform.

Another embodiment takes the form of a method that is performed by a data platform executing instructions on at least one hardware processor. The data platform detects receipt of a database-replication request associated with a data consumer, requesting availability to the data consumer of a local instance of a primary-deployment database in a remote-deployment account of a data provider at a remote deployment of the data platform. The primary-deployment database is resident in a primary-deployment account of the data provider at a primary deployment of the data platform. In response to detecting receipt of the database-replication request, the data platform performs remote-deployment-activation operations including (i) provisioning the remote-deployment account with a set of one or more replication-preparation objects associated with the primary-deployment database and (ii) invoking at least one refresh command with respect to the set of one or more replication-preparation objects. The invoking of the at least one refresh command makes available to the data consumer a local instance of the primary-deployment database in the remote-deployment account of the data provider at the remote deployment of the data platform.

As described by way of example in the preceding two paragraphs, one or more embodiments of the present disclosure take the form of methods that include multiple operations. One or more other embodiments take the form of systems (e.g., data platforms) that include at least one hardware processor and that also include one or more computer-storage media containing instructions that, when executed by the at least one hardware processor, cause the at least one hardware processor to perform multiple operations (that may or may not correspond to operations performed in a herein-disclosed method embodiment). Still one or more other embodiments take the form of one or more computer-storage media containing instructions that, when executed by at least one hardware processor (of, e.g., a data platform), cause the at least one hardware processor to perform multiple operations (that, again, may or may not correspond to operations performed in a herein-disclosed method embodiment and/or operations performed by a herein-disclosed system embodiment).

Various additional embodiments and combinations and permutations thereof are described below in connection with the various figures. Any embodiment, combination, variation, permutation, or the like that is described in this disclosure can be implemented with respect to any type of embodiment. For example, a variation or permutation that is primarily described in this disclosure in connection with a method embodiment could just as well be implemented in connection with a system embodiment (e.g., a data-platform embodiment), a computer-storage-medium embodiment, and/or one or more other types of embodiments. Furthermore, this flexibility and cross-applicability of embodiments is present in spite of the use herein of any slightly different language (e.g., processes, methods, methodologies, steps, operations, functions, etc.) to describe and/or characterize such embodiments and/or any element or elements thereof.

FIG. 1 illustrates an example communication context—in which at least one embodiment could be performed, deployed, and/or the like—that includes an example data platform, multiple example data providers, and multiple example data consumers. The example communication context 100 of FIG. 1 includes an example data platform 102, one or more example cloud platforms 104a-104n, an example data provider 106 serving an example data consumer 108 and an example data consumer 110, and an example data provider 112 also serving the data consumer 110, and further serving an example data consumer 114, an example data consumer 116, and an example data consumer 118. Fewer, more, and/or different instances of one or more of the entities in FIG. 1 could be present in other example situations and scenarios, as the communication context 100 of FIG. 1 is provided here purely by way of example and not limitation.

In various different embodiments, the data platform 102 can be used for performing one or more of the operations (e.g., one or more of the methods, processes, and/or the like) that are disclosed herein. As a general matter, in at least some embodiments, the data platform 102 can be referred to using terms such as a cloud-based data warehouse, a network-based data warehouse, or simply a data warehouse. A cloud-based data warehouse is one type of network-based data system that can be used, as examples, for data analysis and reporting, and that includes a central repository of integrated data from one or more disparate sources. A cloud-based data warehouse is commonly an OLAP database that can store current and historical data that can be used, for example, for creating analytical reports for an enterprise based on data stored within databases maintained on behalf of the enterprise. Data warehouses often provide business-intelligence tools, tools to perform extract-transform-load (ETL) tasks for ingesting data into the repository, tools to manage and retrieve metadata, and/or the like. Moreover, there are other types of cloud-based data warehouses, such as OLTP databases, as well as data warehouses and other data systems that operate with characteristics of multiple types of database systems.

Prior to discussing the communication context 100 of FIG. 1 in further specificity, it is noted that any one or more of the components, devices, systems, and/or the like that are depicted in FIG. 1 and/or in any of the other figures could be implemented as one or more computing devices having an architecture that is similar to the example computing device 1100 that is depicted in and described below in connection with FIG. 11. Moreover, two or more of the entities that are depicted in any of the figures could be combined into a single component, and any entity that is depicted as a single component in any of the figures could instead be distributed across multiple components (e.g., distributed across multiple systems, platforms, and/or the like at multiple geographic locations). Moreover, in particular embodiments, any one or more of the communication links depicted in FIG. 1 and/or in any of the other figures may utilize any communication protocol and any type of communication medium deemed suitable by those of skill in the art for a given implementation or in a given context. Additionally, in various embodiments, one or more of the communication links depicted herein could be implemented via one or more data-communication networks. In some embodiments, a given data-communication network could be a combination of two or more data-communication networks (or sub-networks) coupled to one another.

In at least one embodiment, and as depicted in FIG. 1, the data platform 102 includes a database manager 120, which in turn includes a resource manager 122 and an execution platform 124. The database manager 120 need not be a defined physical device, though it could be, but in general is used herein as shorthand to refer to the combination of the resource manager 122 and the execution platform 124. The execution platform 124 may include one or more execution nodes (e.g., servers, workers, threads, and/or the like). A grouping of execution nodes in the execution platform 124 may be referred to as a virtual warehouse, and such virtual warehouses are, in at least some embodiments, dynamically scalable to meet dynamically changing demands. Also depicted in FIG. 1 as being components of the data platform 102 are a metadata storage 126 and a storage platform 128, the latter of which includes one or more data-storage devices 130.

In some embodiments, different sets of entities are part of what is referred to herein as the data platform 102. For example, in at least one embodiment, the data platform 102 does not include any of the one or more clients 132 or clients 134. As another example, in some embodiments, the data platform 102 does not include the storage platform 128. In the embodiments that are primarily described herein to illustrate various examples, and as is depicted in FIG. 1, the data platform 102 includes the database manager 120 (including the resource manager 122 and the execution platform 124), the metadata storage 126, and the storage platform 128, and does not include any of the other entities that are depicted in FIG. 1. As described below and as mentioned above, the storage platform 128 could be implemented in whole or in part on a cloud platform and still be considered part of the data platform 102.

The resource manager 122 may be configured to manage a number of different types of tasks including external database tasks (e.g., query requests) that are received from, e.g., a client 132 or a client 134. The resource manager 122 may be coupled to any number of clients 132, clients 134, and/or any number of other clients. A client 132 or client 134 may facilitate end users making data-storage and/or data-retrieval requests, system administrators managing the data platform 102, and/or the like. In various different embodiments, a client 132 or a client 134 could be a web interface, a JDBC driver, an ODBC driver, a desktop application, a mobile app, and/or another type of client. As shown in FIG. 1, a client 132 may communicate with the data platform 102 (e.g., the resource manager 122 of the database manager 120) and with one or more cloud platforms 104. A client 132 or a client 134 could reside on a client-side computing device on which the client 132 or the client 134 interacts with one or more client-side applications and on which the client 132 or the client 134 makes use of certain client-side-system resources such as network interfaces, user interfaces, memory (e.g., random access memory (RAM)), and/or the like.

As depicted in FIG. 1, the resource manager 122 is communicatively coupled to the metadata storage 126, which in at least one embodiment is associated with data stored throughout the communication context 100. Indeed, in some embodiments, the metadata storage 126 includes one or more summaries of data available in one or more local caches (of, e.g., the resource manager 122 and/or the execution platform 124), data stored in the storage platform 128, and/or the like. In various embodiments, metadata—that reflects the contents of a database, a table, a column, a materialized view, and/or one or more other collections of records or parts of records—may be referred to herein as expression properties. Additionally, the metadata storage 126 may include information regarding how data is organized in one or more local caches, one or more storage platforms 128, and/or the like.

Among other uses, the metadata storage 126 may allow systems and services of the communication context 100 to determine whether a given quantum of data needs to be processed (in connection with, e.g., a given query) without loading or accessing the actual stored data. In various embodiments, metadata may reflect the contents of one or more databases, one or more tables, one or more columns, one or more materialized views, and/or one or more other collections of records, parts of records, and/or other data quanta. With respect to where the metadata storage 126 is actually stored, a separate (e.g., local) storage location (e.g., a key-value store) is used in some embodiments, while in other embodiments the metadata storage 126 is maintained by the communication context 100 as a subset of the data stored in the storage platform 128. Other architectures are possible as well.

In the depicted arrangement, the resource manager 122 is also communicatively coupled to the execution platform 124, which may provide multiple computing resources that execute various tasks involving data storage, data retrieval, data analysis (e.g., query processing), and/or the like. In at least one embodiment, the resource manager 122 includes a layer of code (e.g., Java code) that is global with respect to the communication context 100, where that code layer includes instructions for performing functions such as compiling queries and brokering requests to one or more execution nodes in the execution platform 124. In some embodiments, there exists (i) one or more instances of the execution platform 124 that is/are used for executing client tasks such as database queries and (ii) one or more instances of the execution platform 124 that is/are used for executing internal database tasks such as updating metadata, clustering tables, generating materialized views, and/or the like. In some such embodiments, there also exists one or more instances of the execution platform 124 that is/are used for feature development and/or testing of the communication context 100, and each such instance of the execution platform 124 may be separate from each client-task instance of the execution platform 124, such that, for example, client-task processing is not impacted by feature-development tasks, data-platform-administration tasks, and/or the like. Other arrangements are possible as well.

The execution platform 124 may be coupled to the one or more data-storage devices 130 that are part of the storage platform 128, which may include (and an execution platform 124 may be capable of communicating with) any number of data-storage devices 130. In some embodiments, one or more of the data-storage devices 130 are cloud-based storage devices located in one or more geographic locations. For example, one or more of the data-storage devices 130 may be part of a public cloud infrastructure or a private cloud infrastructure. One or more of the data-storage devices 130 may be or include hard disk drives (HDDs), solid state drives (SSDs), storage clusters, and/or any other data-storage technology. In some examples, the storage platform 128 includes distributed file systems (such as Hadoop Distributed File Systems (HDFSs)), object storage systems, and/or the like.

As shown in FIG. 1, the storage platform 128, including the one or more data-storage devices 130, is decoupled from the computing resources of the resource manager 122, the execution platform 124, and the database manager 120 generally. In an embodiment, each of a plurality of data-platform deployments includes a respective storage platform 128 having its own respective one or more data-storage devices. That type of architecture supports dynamic changes made by the communication context 100 based on changing data-storage and/or data-retrieval needs, as well as changing needs of users and systems accessing the communication context 100. The support of dynamic changes allows the communication context 100 to scale quickly in response to changing demands on the systems and components within the communication context 100. The decoupling of the computing resources of the database manager 120 from the data-storage devices 130 of the storage platform 128 supports the storage of large amounts of data without requiring a corresponding large amount of computing resources. Similarly, this decoupling supports a significant increase in the computing resources utilized at a particular time without requiring a corresponding increase in data-storage resources.

Figure 2:
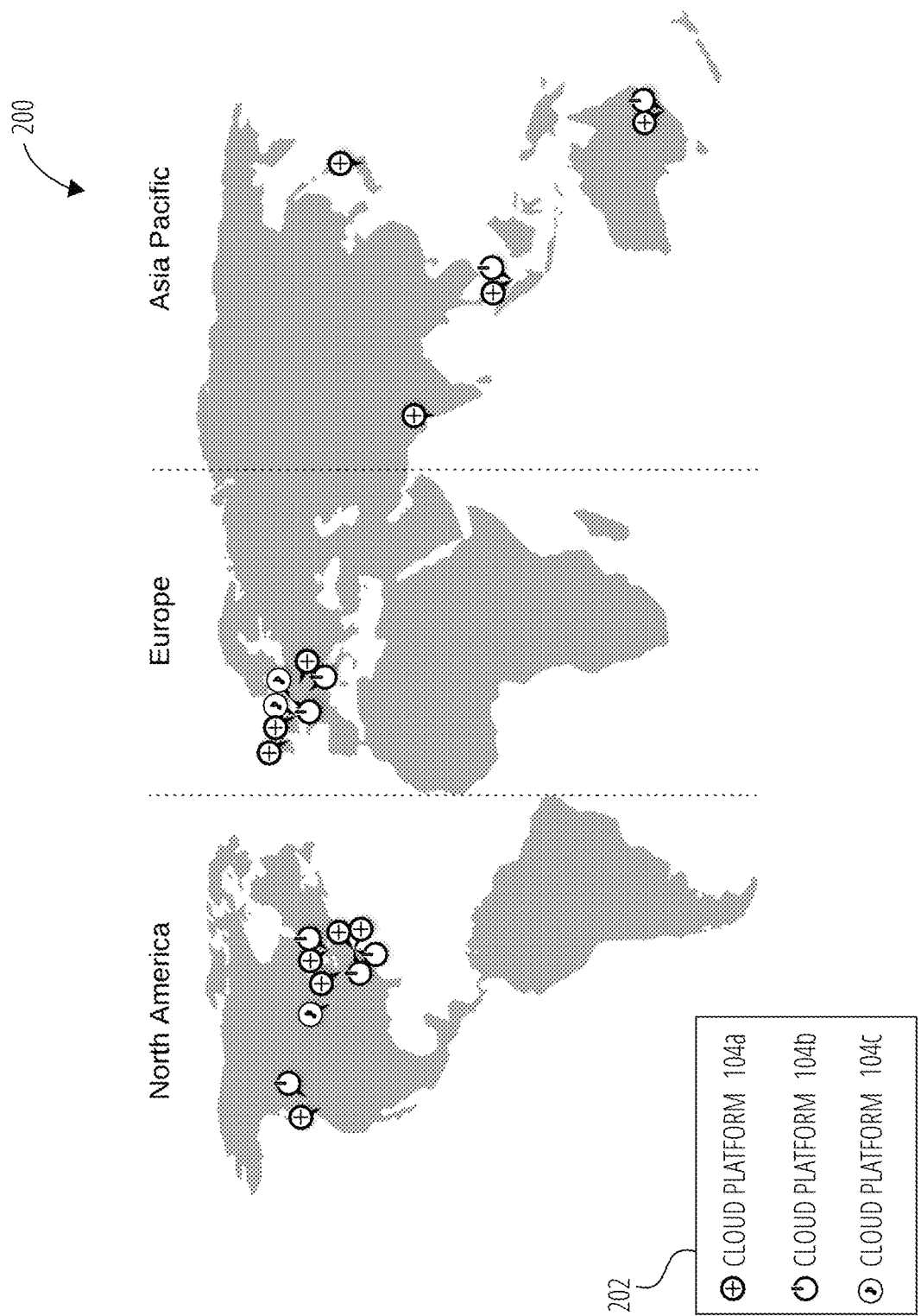
FIG. 2 illustrates an example regional-deployment map for the example data platform of FIG. 1, in accordance with at least one embodiment.

FIG. 2 illustrates an example regional-deployment map 200 for the example data platform 102 of FIG. 1, in accordance with at least one embodiment. The regional-deployment map 200 is presented purely by way of example and not limitation, as different numbers and/or boundaries of regions could be demarcated in various different implementations. As can be seen in FIG. 2, the regional-deployment map 200 includes three example regions: North America, Europe, and Asia Pacific. Moreover, various instances of deployments of the data platform 102 are depicted on the regional-deployment map 200. A legend 202 shows that deployments having a circle with a "+" sign therein are representative of deployments of the data platform 102 that are hosted by the cloud platform 104*a*. Additionally, a power-on symbol is used in FIG. 2 to represent deployments of the data platform 102 that are hosted by the cloud platform 104*b*, and circles having a musical note icon therein are shown as being representative of deployments of the data platform 102 that are hosted by the cloud platform 104*c*.

Figure 3:
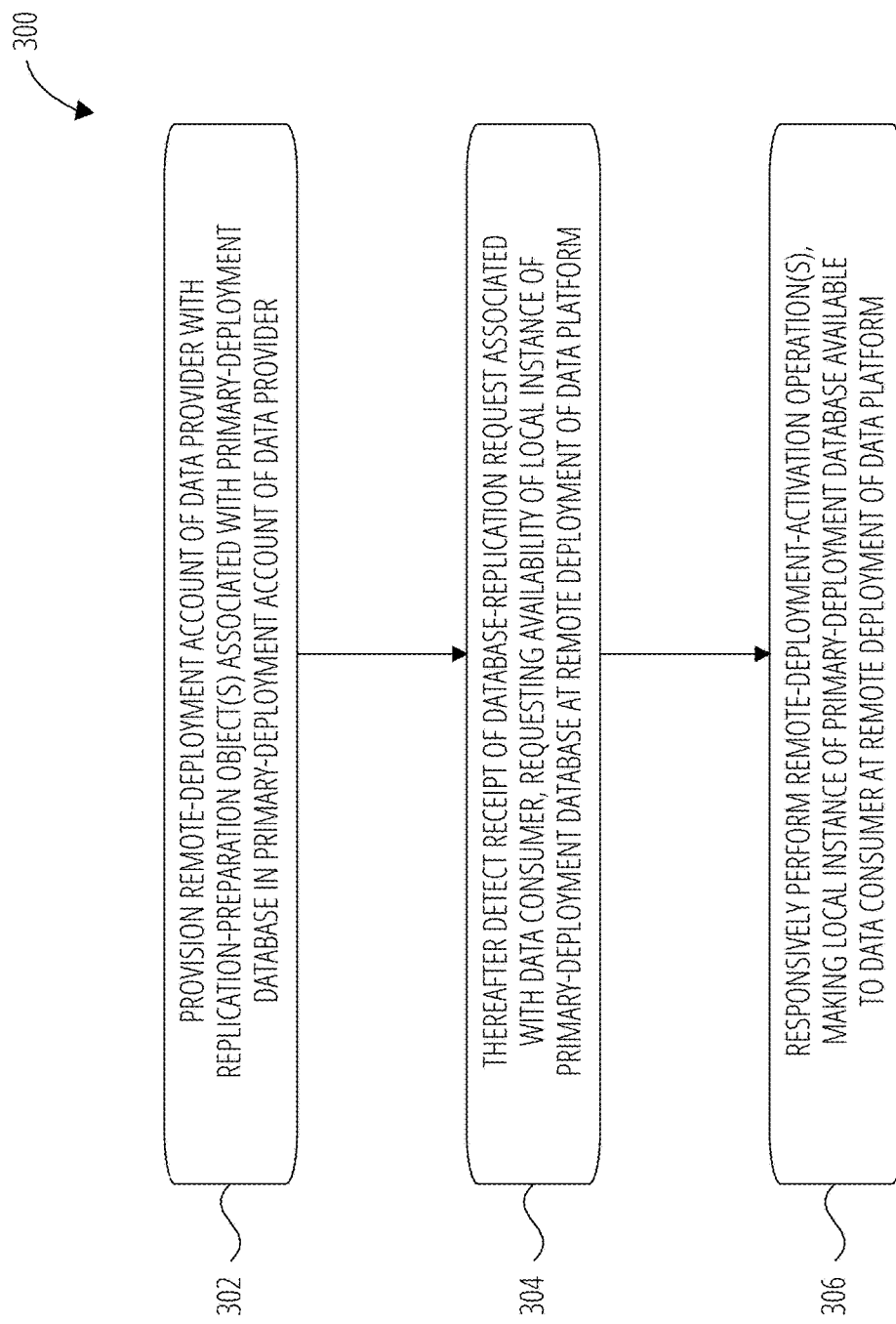
FIG. 3 illustrates a first example method, in accordance with at least one embodiment.

FIG. 3 illustrates an example method 300, in accordance with at least one embodiment. In various different embodiments, the method 300 could be performed by any computing and communication device or system of such devices that is suitably equipped and programmed to perform the operations described herein. By way of example and not limitation, the method 300 is described below as being performed by the data platform 102. In the explanation below, the method 300 is described in the context of a first example scenario that is depicted across FIG. 3, FIG. 4, and FIG. 5. By way of example and not limitation, the method 300 is described here using the data platform 102, the data provider 106, the data consumer 108, and the data consumer 110 of FIG. 1 as illuminating example entities. By way of convenience, these are also the example entities that are used to describe a second example scenario in connection with a method 700 of FIG. 7 in conjunction with FIG. 8, FIG. 9, and FIG. 10.

Figure 4:
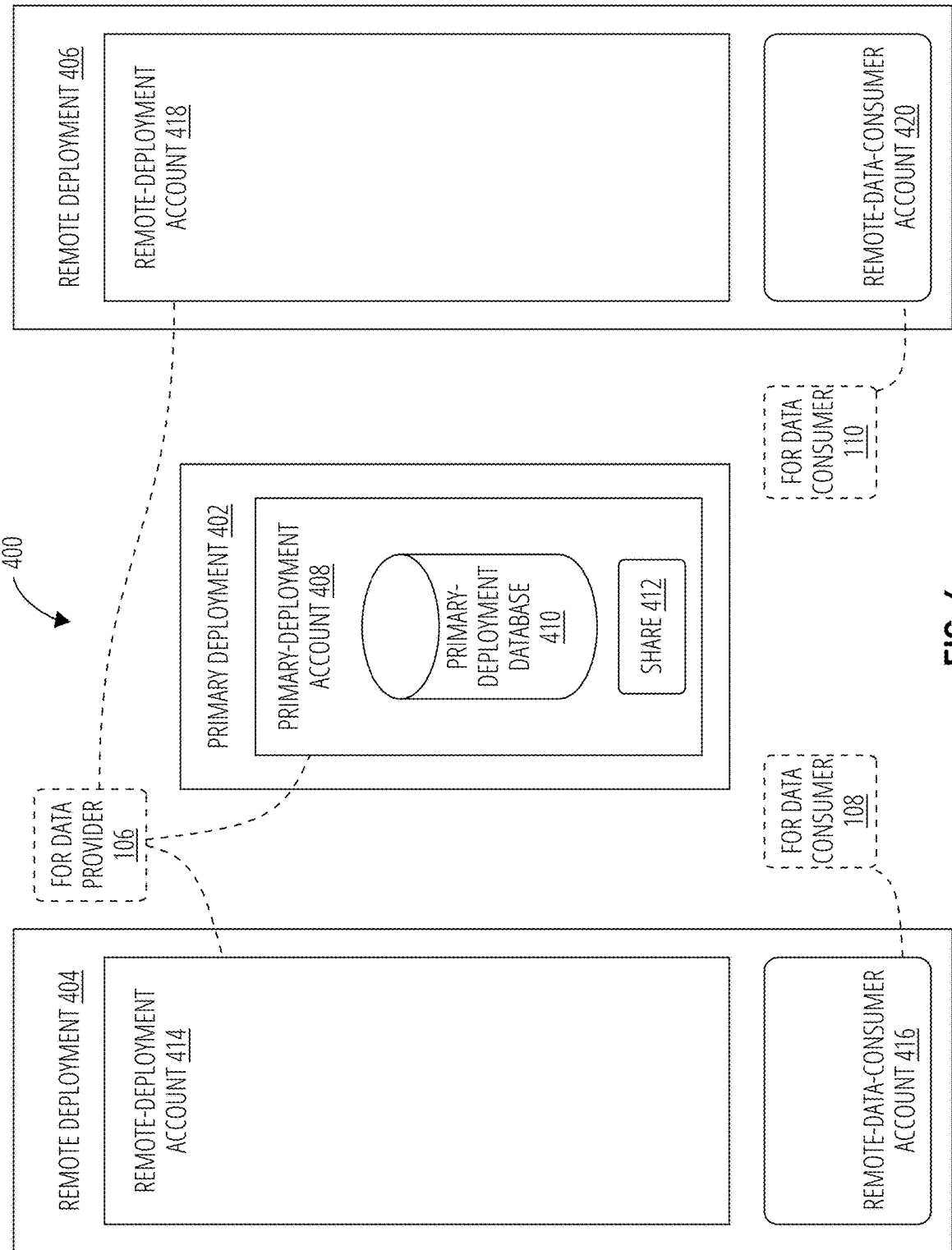
FIG. 4 illustrates a first example state of an example multi-deployment arrangement that includes the example data platform, the example data providers, and some of the example data consumers of the example communication context of FIG. 1, in accordance with at least one embodiment.

In the first example scenario that is described here by way of example in connection with FIG. 3, FIG. 4, FIG. 5, and FIG. 6, the data platform 102 has at least three deployments as shown in FIG. 4, which generally depicts an example state 400 of an example multi-deployment arrangement. The example multi-deployment arrangement of FIG. 4 includes a primary deployment 402 of the data platform 102, a first remote deployment 404 of the data platform 102, and a second remote deployment 406 of the data platform 102. In this first example scenario, the data provider 106 has a primary-deployment account 408 at the primary deployment 402, a remote-deployment account 414 at the remote deployment 404, and a remote-deployment account 418 at the remote deployment 406. Moreover, in this first example scenario, the remote deployment 404 also includes a remote-data-consumer account 416 that is associated with the data consumer 108, and the remote deployment 406 also includes a remote-data-consumer account 420 that is associated with the data consumer 110. All of this is by way of example and not limitation.

The data provider 106 in this first example scenario also has a primary-deployment database 410 that is resident in its primary-deployment account 408 at the primary deployment 402 of the data platform 102. Also resident in the primary-deployment account 408 is a primary-deployment share 412, which in various embodiments is a companion object to the primary-deployment database 410. As discussed herein, in at least some embodiments, a share is an object that acts as an access-control (including, e.g., visibility control) container for, e.g., a database such as the primary-deployment database 410. In various different embodiments, outside of the data platform 102 itself, only entities that have had a given share shared with them are able to see and access whatever one or more objects (e.g., one or more databases) are encompassed by that given share. A given entity, user, and/or the like could also or instead have been assigned privileges to access a given share in a manner that doesn't necessarily fit the "sharing a share" paradigm that is discussed in the present disclosure by way of example. Other particular rules-based access control (RBAC) approaches could be used as well.

Returning now to FIG. 3, operation 302 is discussed at least in part in connection with FIG. 5, which depicts a second example state 500 that is later in time in this example than the state 400 of FIG. 4, which is essentially depicting an example initial condition prior to an execution of the method 300. It is noted that, in at least one embodiment, an initial state such as the state 400 that is depicted in FIG. 4 does not yet have any accounts established in the remote deployments. In the operation 302, the data platform 102 provisions the remote-deployment account 414 of the data provider 106 at the remote deployment 404 of the data platform 102. In particular, in at least one embodiment, operation 302 includes the data platform 102 provisioning the remote-deployment account 414 with a set of one or more of what are referred to in the present disclosure as "replication-preparation objects."

Each of the provisioned replication-preparation objects is, in at least one embodiment, associated with the primary-deployment database 410 that is resident in the primary-deployment account 408 of the data provider 106 at the primary deployment 402 of the data platform 102. In the depicted example, the replication-preparation objects are (i) a set of one or more remote-deployment tasks 502, (ii) a remote-deployment database shell 504, and a remote-deployment share shell 506. As discussed herein, these objects shells 504 and remote-deployment share shell 506 include structure of the corresponding object but do not, in the case of the remote-deployment database shell 504, contain any substantive data from the primary-deployment database 410, and no active syncing is going on in FIG. 5.

Figure 5:
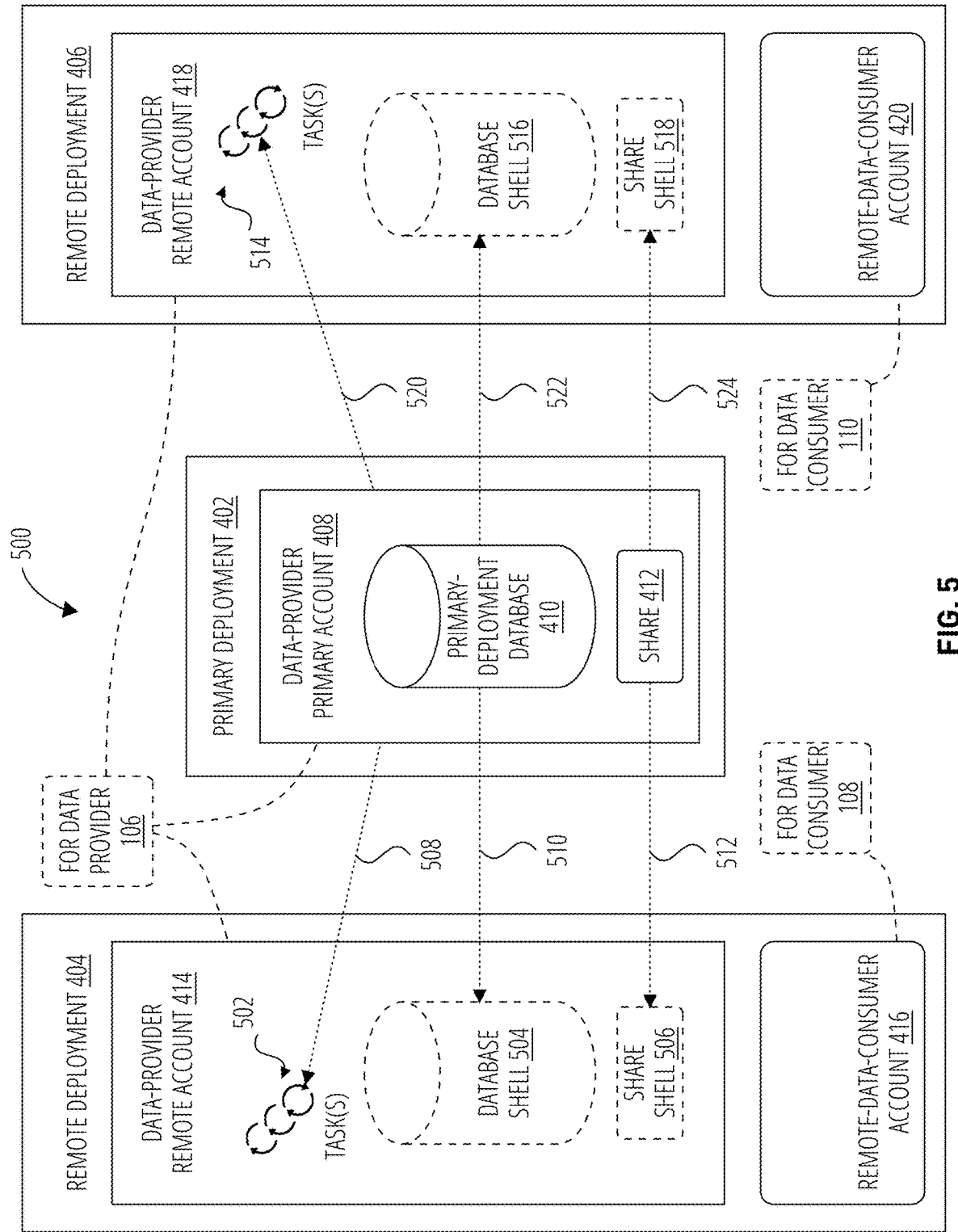
FIG. 5 illustrates a second example state of the example multi-deployment arrangement of FIG. 1, in accordance with at least one embodiment.

It can also be seen in FIG. 5 that the data platform 102 additionally provisions the remote-deployment account 418 of the data provider 106, where the remote-deployment account 418 is located at the remote deployment 406 of the data platform 102. The provisioned objects are similar: (i) a set of one or more remote-deployment tasks 514, (ii) a remote-deployment database shell 516, and a remote-deployment share shell 518. Thus, in accordance with this first example scenario, prior to any customer (data consumer) of the data provider 106 requesting a remote instance of a given database, the data platform 102 has put one or more tasks, a shell database, and a shell share in place both in the remote-deployment account 414 at the remote deployment 404 of the data platform 102 and in the remote-deployment account 418 at the remote deployment 406 of the data platform 102. Both the task(s) 502 and the task(s) 514 may monitor for database-replication requests in the respective remote-deployment account in which they have been provisioned.

The one-time transmission (e.g., provisioning) of the various tasks, database shells, and share shells are indicated in FIG. 5 by the provisioning arrows 508, 510, 512, 520, 522, and 524. And while the term "one-time transmission" is used here, there could be multiple messages, occasional updates, and so forth, but not a pushed stream of active-syncing updates.

At operation 304, the data platform 102 detects receipt, after the provisioning that occurs during operation 302, of a database-replication request that is associated with the data consumer 108, which is a consumer of data from the data provider 106, as depicted in FIG. 1. The database-replication request is sent to request availability (to the data consumer 108) of a local instance of the primary-deployment database 410 in the remote-deployment account 414 of the data provider 106 at the remote deployment 404 of the data platform 102.

At operation 306, in response to detecting receipt (at operation 304) of the database-replication request, the data platform 102 performs one or more of what are referred to in the present disclosure as "remote-deployment-activation operations." In at least one embodiment, the performing of the one or more remote-deployment-activation operations at operation 306 makes a local instance of the primary-deployment database 410 available to the data consumer 108 in the remote-deployment account 414 of the data provider 106 at the remote deployment 404 of the data platform 102.

Figure 6:
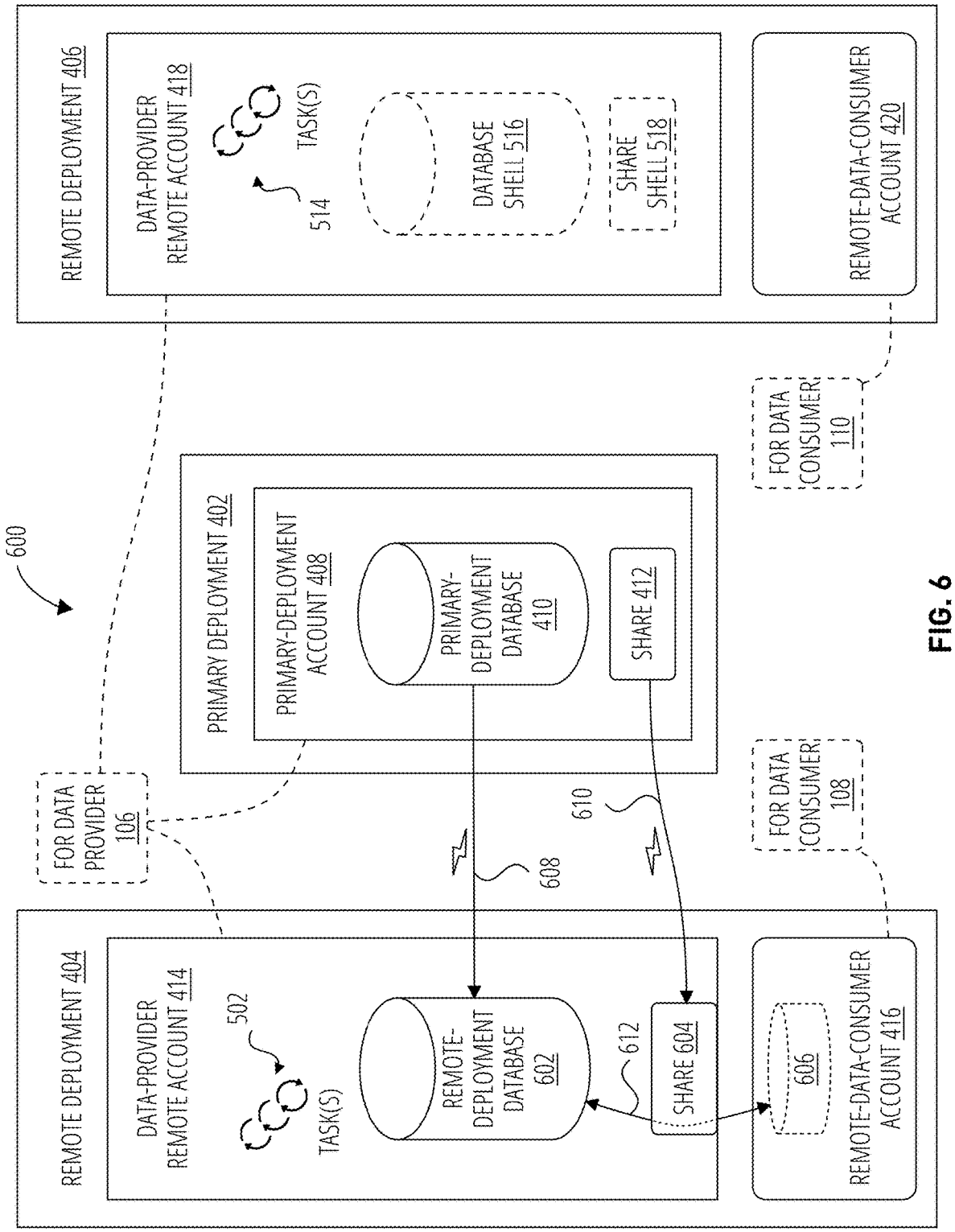
FIG. 6 illustrates a third example state of the example multi-deployment arrangement of FIG. 1, in accordance with at least one embodiment.

As shown in FIG. 6, the provisioning arrow 508 is gone and in its place is an active-syncing arrow 608 (with a lightning-bolt icon meant to convey active syncing) from the primary-deployment database 410 to the remote-deployment database 602, which has replaced the remote-deployment database shell 504 due to the active syncing. Similarly, the provisioning arrow 510 is gone and in its place is an active-syncing arrow 610 from the primary-deployment share 412 to the remote-deployment share 604, which has replaced the remote-deployment share shell 506. Also depicted in FIG. 6 is that the remote-data-consumer account 416 now includes a database-reference object 606, which is used in at least one embodiment by the remote-data-consumer account 416 to access the remote-deployment database 602 via the remote-deployment share 604, as indicated by a database-access arrow 612. It can also be seen in FIG. 6 that the provisioning arrows 520, 522, and 524 are gone, though nothing has yet taken their place, and all on the side of the remote deployment 406 is as it was in FIG. 5. This is because, as of the snapshot in time represented by the state 600 in FIG. 6, a request by a data consumer has not yet been detected by the remote-deployment task 514 that was provisioned into the remote-deployment account 418 during operation 304.

In some embodiments, the one or more remote-deployment-activation operations performed in connection with operation 306 involve invoking a database-refresh operation that initiates the pushing of database data from the primary-deployment database 410 to the remote-deployment database shell 504, effecting the transition of the remote-deployment database shell 504 to the remote-deployment database 602. The remote-deployment database 602 in at least one embodiment is, once the syncing has caught up to be current, a local instance of the primary-deployment database 410 in the remote-deployment account 414 of the data provider 106 at the remote deployment 404 of the data platform 102.

Similarly, in some embodiments, the one or more remote-deployment-activation operations performed in connection with operation 306 involve invoking a share-refresh operation that provides the data consumer 108 (via the remote-data-consumer account 416) with access to the remote-deployment database 602 via the remote-deployment share 604. A share-refresh option of this type may initiate the pushing of share data from the primary-deployment share 412 to the remote-deployment share shell 506. The pushing of share data may modify the remote-deployment share shell 506 into the remote-deployment share 604 that is resident in the remote-deployment account 414 of the data provider 106 at the remote deployment 404. Part of operation 306 may involve operations that make the remote-deployment share 604 visible to the remote-data-consumer account 416, illustrated by the fact that the remote-deployment share 604 is at the edge of the remote-deployment account 414 in FIG. 6, compared to the internal position in the remote-deployment account 414 of the remote-deployment share shell 506 in FIG. 5.

In at least one embodiment, consumer accounts such as the remote-data-consumer account 416 and the remote-data-consumer account 420 receive read-only access to the relevant remote database instance. Moreover, in at least one embodiment, the data platform 102 names and creates the data-provider remote accounts such as the remote-deployment account 414 and the remote-deployment account 418 and limits the privileges of these accounts to tasks related to database replication and refresh and associated tasks in accordance with the present disclosure.

When a data consumer requests access to a remote-deployment database that is already syncing and has already been made operable for one or more prior consumers, that next data consumer may simply be granted access to the relevant share, which will give them access to the desired database. If it happens that a data customer that is presently the only data customer using a given remote-deployment database decides to unsubscribe or otherwise stop using that data, the data platform 102 may pause the syncing but may persist the data for some period of time in case another consumer requests access.

In at least one embodiment, the data platform 102 uses a secure-shell data connection between the primary deployment 402 and remote deployments such as the remote deployment 404 and the remote deployment 406. The data platform 102 may limit use of embodiments of the present disclosure to accounts that have enabled the capability to communicate over such a secure connection.

Furthermore, to initiate the creation of a remote deployment access to a given database, a user (e.g., admin) at a data provider may create a listing on a marketplace-type interface where various data sources are made available for purchase, subscription, and the like. Once provided with a replication script, the data provider may execute that script an gain access in accordance with embodiments of the present disclosure.

Embodiments of the present disclosure simplify the replication process and automate it such that, in some embodiments, no data is replicated until a consumer requests it. Scripts designed to execute the functions described herein may enable providers to create objects that serve as scaffolding for database replication and share replication in other regions such that when a consumer from one of the remote regions requests data, the database refresh and share refresh are responsively executed.

In some embodiments, data providers can initiate execution of the herein-described processes by providing a small set of parameters to a given script: e.g., a listing name, an exchange name, and a refresh frequency, as an example.

Certain notifications may be implemented, including actions such as:
Notify consumer in remote region when database and share refresh completes (e.g., first time only)
Notify provider when the first consumer starts the database and share refresh process
Notify provider when the last consumer causes remote database and share refresh to stop Focus is now shifted to the above-mentioned second example scenario, which is discussed here in connection with FIG. 7, FIG. 8, FIG. 9, and FIG. 10. There are a number of aspects of FIG. 8, FIG. 9, and FIG. 10 that are respectively similar to aspects of FIG. 4, FIG. 5, and FIG. 6. As such, those aspects are not fully described again in the context of the second example scenario. In connection with the first example scenario, the method 300, FIG. 4, FIG. 5, and FIG. 6, it can be seen that both the remote-deployment account 414 and the remote-deployment account 418 are proactively provisioned with the herein-described objects. That is, the provisioning occurs in each remote-deployment account whether a data consumer has requested a local instance of the database or not.

Figure 9:
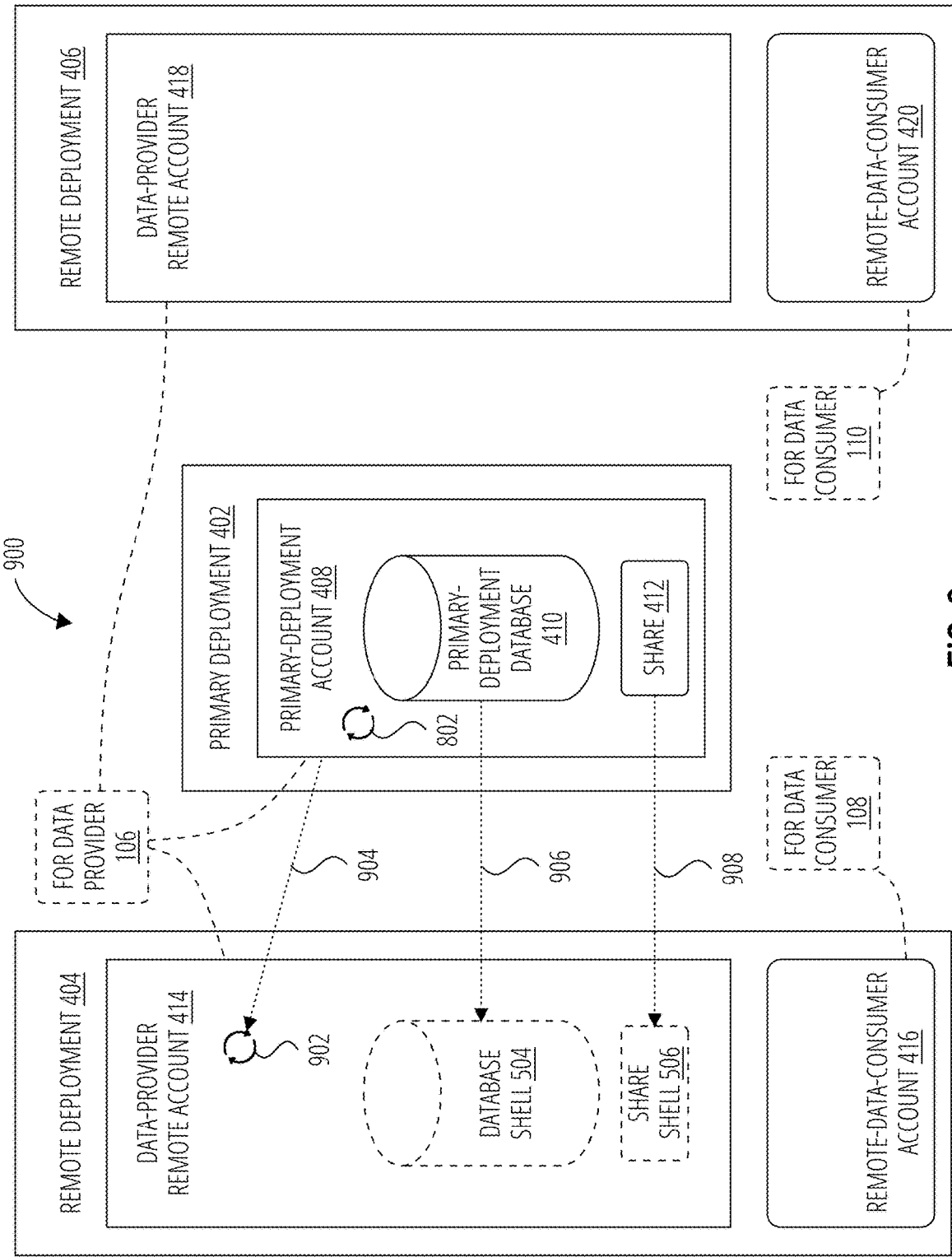
FIG. 9 illustrates a fifth example state of the example multi-deployment arrangement of FIG. 1, in accordance with at least one embodiment.
Figure 10:
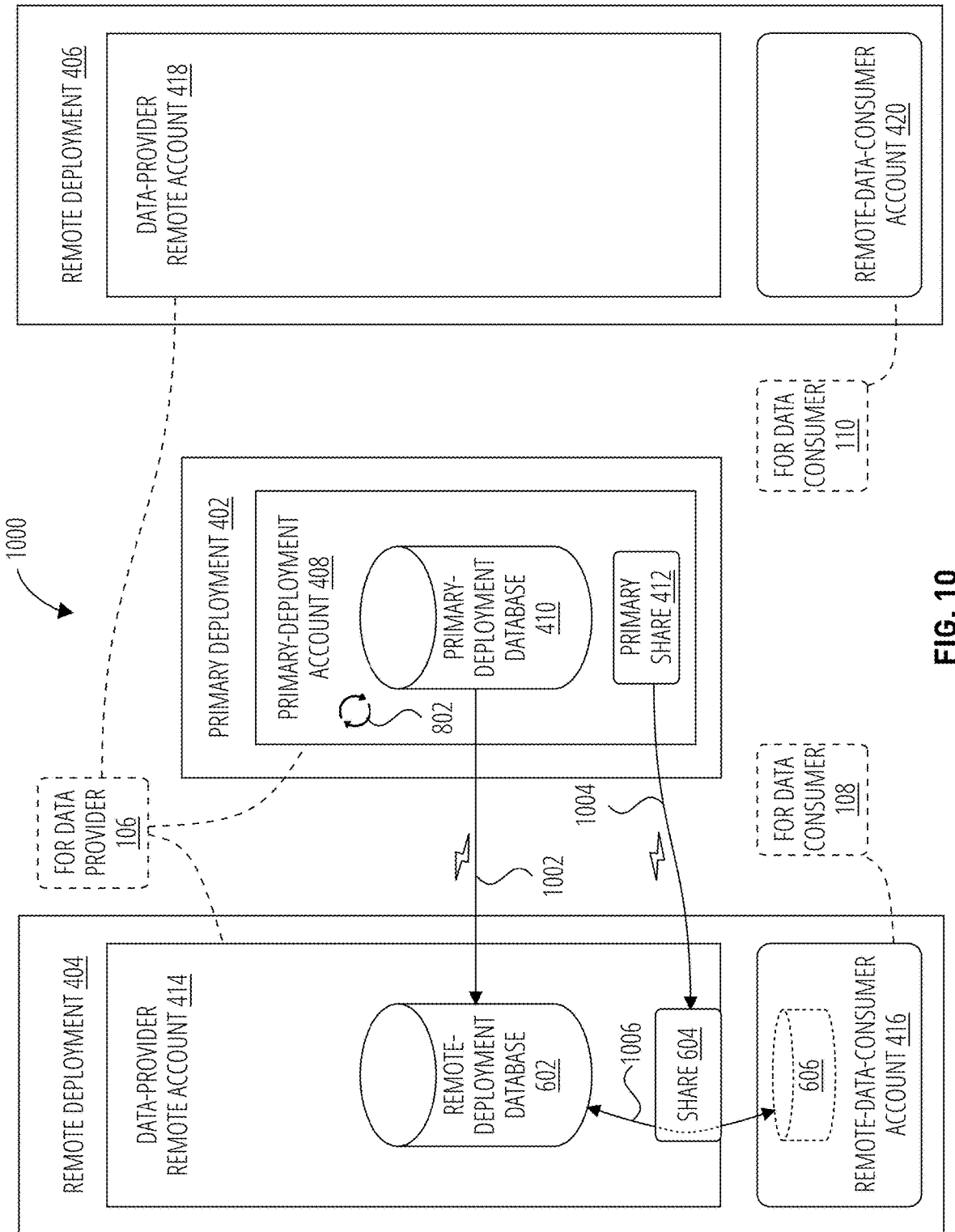
FIG. 10 illustrates a sixth example state of the example multi-deployment arrangement of FIG. 1, in accordance with at least one embodiment.

A different approach is described below in connection with the second example scenario, the method 700, FIG. 8, FIG. 9, and FIG. 10. In that approach the provisioning is not done as a matter of course for one or more remote-deployment accounts (i.e., whether or not a data consumer has requested a local instance of a given database, which might never happen). Instead, in the approach that is described below, a remote-deployment account is not provisioned until such a request occurs. At that time, the provisioning occurs and that is shortly followed by the activation of the active syncing.

Of course there are pros and cons to each approach (e.g., a con of the first approach might be the consuming of resources by conducting provisioning of objects that may never be used, whereas a con of the second approach may be that a remote-deployment account of a given data provider is less ready to set up a requested local instance of a database than it would be under the first approach).

Figure 7:
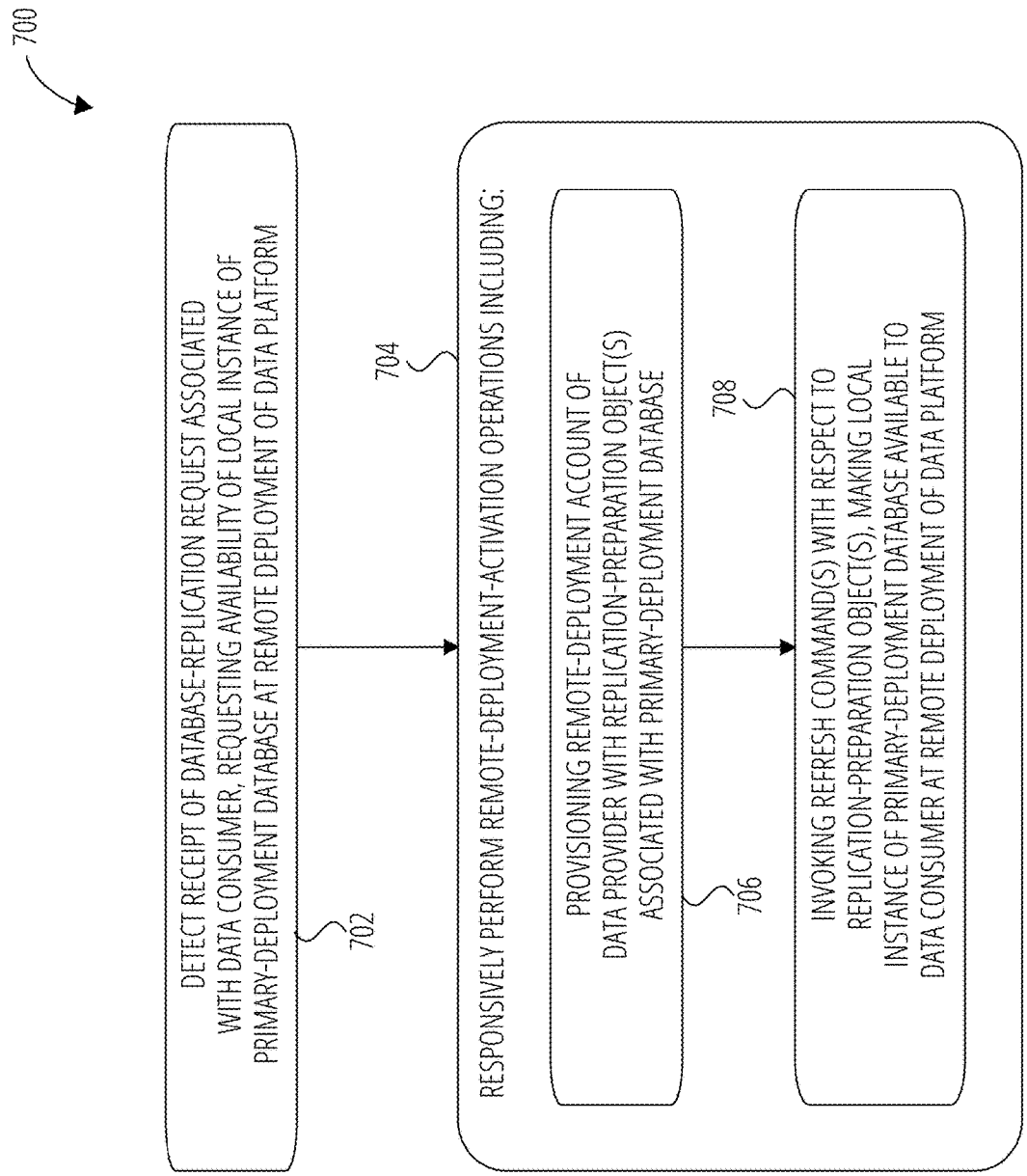
FIG. 7 illustrates a second example method, in accordance with at least one embodiment.

Turning now to FIG. 7 in particular, it is first noted that, like the method 300, the method 700 could be performed by any computing and communication device or system of such devices that is suitably equipped and programmed to perform the operations described herein. By way of example and not limitation, the method 700 is described below as being performed by the data platform 102. The various permutations, versions, embodiments, and so forth that are described herein in connection with the method 300 also apply to the method 700.

Figure 8:
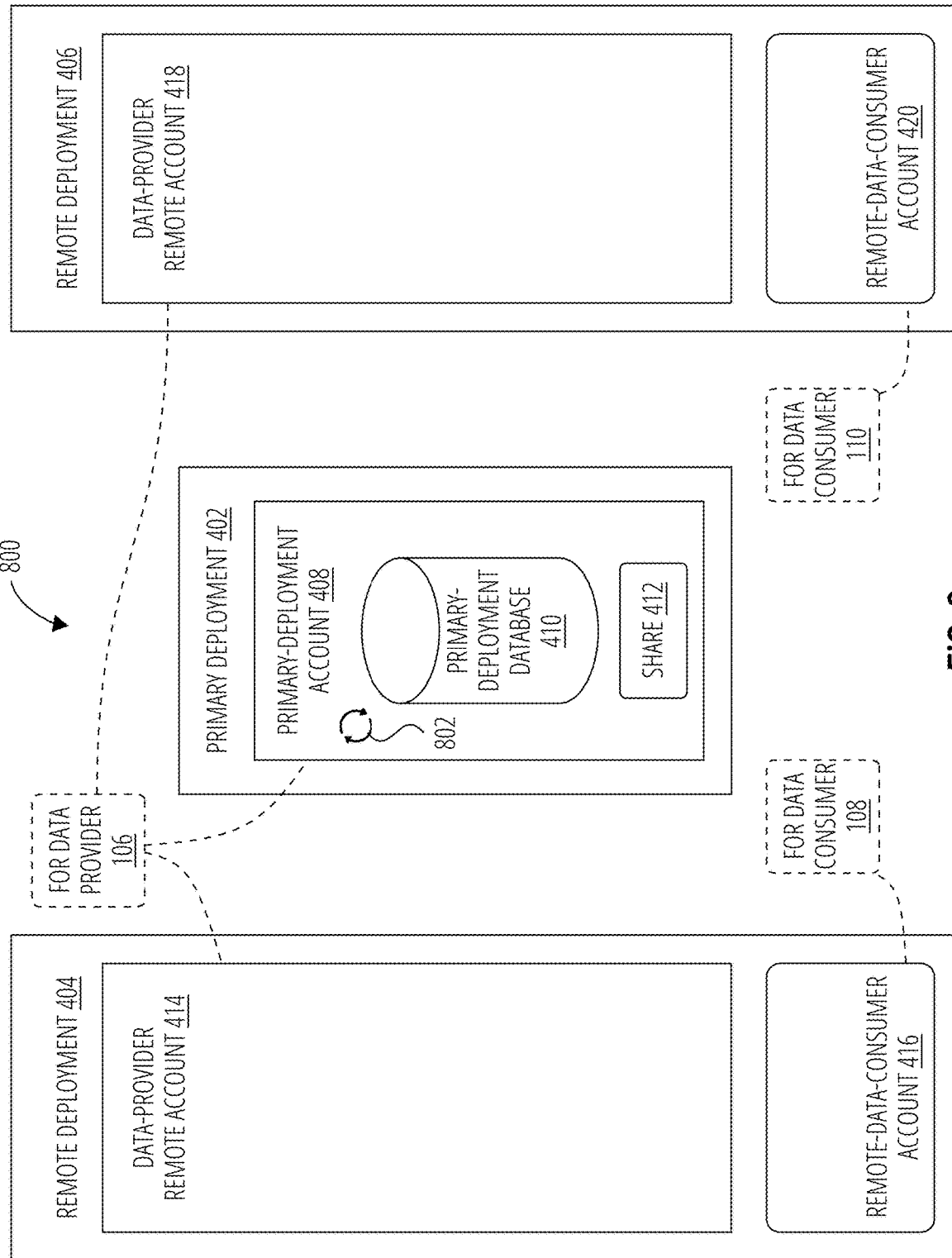
FIG. 8 illustrates a fourth example state of the example multi-deployment arrangement of FIG. 1, in accordance with at least one embodiment.

At operation 702, and with reference also to the example initial state 800 that is depicted in FIG. 8, the data platform 102 detects receipt of a database-replication request associated with the data consumer 108. The database-replication request in the present example is or at least includes a request from the data consumer 108 for availability of a local instance of the primary-deployment database 410 in the remote-deployment account 414 of the data provider 106 at the remote deployment 404 of the data platform 102. Those aspects are described above in connection with the first example scenario. In an embodiment, a request-monitoring task 802 may execute in the primary-deployment account 408 of the data provider 106 at the primary deployment 402. The request-monitoring task 802 may monitor for receipt of such requests, perhaps among other functions.

At operation 704, in response to detecting receipt of the database-replication request (at operation 702), the data platform 102 performs multiple remote-deployment-activation operations that include the below-described operation 706 and operation 708. Reference is made to the example state 900 of FIG. 9 in connection with the operation 706, and to the example state 1000 of FIG. 10 in connection with the operation 708.

At operation 706, the data platform 102 provisions the remote-deployment account 414 with a set of one or more replication-preparation objects associated with the primary-deployment database 410, examples of which are described above. The depicted provisioned objects are a remote-deployment task 902, the above-described remote-deployment database shell 504, and the above-described remote-deployment share shell 506.

These objects are depicted as being provisioned from the primary-deployment account 408 (or more generally the data platform 102, as the depiction of the objects all emerging from the primary-deployment account 408 is by way of example). The provisioning of the remote-deployment task 902 is depicted with a provisioning arrow 904, the provisioning of the remote-deployment database shell 504 is depicted with a provisioning arrow 906, and the provisioning of the remote-deployment share shell 506 is depicted with a provisioning arrow 908. The remote-deployment task 902 may be a task that monitors for detection of consumer requests.

At operation 708, the data platform 102 invokes at least one refresh command with respect to the set of one or more replication-preparation objects that it provisioned at operation 706. In at least one embodiment, the invoking of the at least one refresh command makes available to the data consumer 108 a local instance of the primary-deployment account 408 in the remote-deployment account 414 of the data provider 106 at the remote deployment 404 of the data platform 102.

Parallels of these aspects of operation 708 are also discussed above in connection with the method 300. These aspects are depicted in FIG. 10 with the active-syncing arrow 1002 replacing the provisioning arrow 906, the active-syncing arrow 1004 replacing the provisioning arrow 908, the conversion of the remote-deployment database shell 504 to the remote-deployment database 602, and the conversion of the remote-deployment share shell 506 to the remote-deployment share 604. The remote-data-consumer account 416 is shown as including the database-reference object 606, which the remote-data-consumer account 416 may used to access the remote-deployment database 602 via the remote-deployment share 604 via a database-access arrow 1006 in a manner similar to that depicted in FIG. 6.

It is noted that the right side—i.e., the remote deployment 406 remains empty throughout this second example scenario, as the proactive provisioning that is performed in connection with the first example scenario is not performed (prior to a data-consumer request) in connection with the second example scenario. It is contemplated that any suitable amount of time may pass between the performance of the operation 706 and the performance of the operation 708. In many embodiments, there will hardly be any time at all (e.g., the miniscule amount of time taken to move from executing one portion of a given program to executing another). In other embodiments, more time may be taken for reasons deemed suitable by those of skill in the art for a given implementation.

Figure 11:
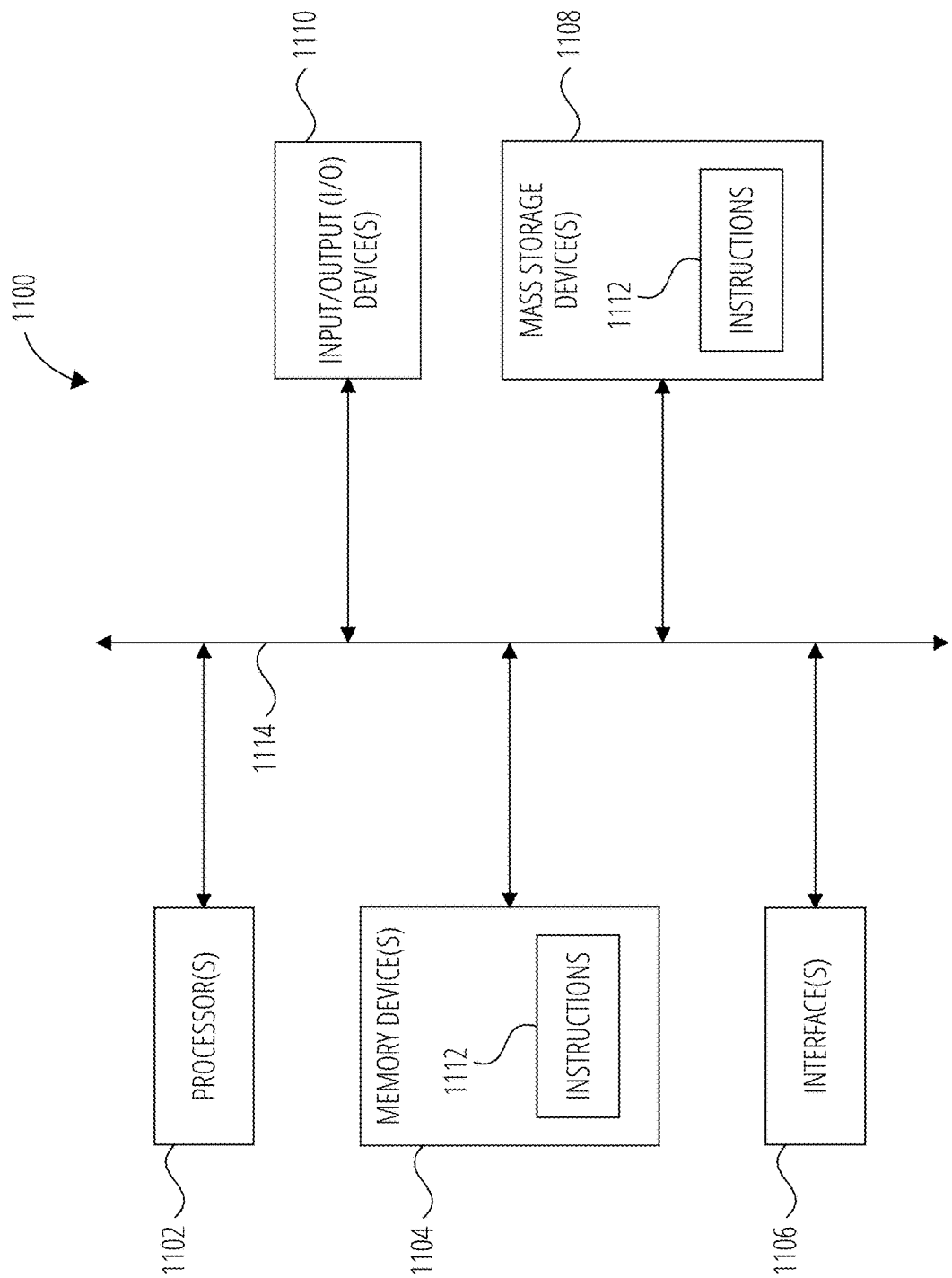
FIG. 11 illustrates an example computing device, in accordance with at least one embodiment.

FIG. 11 illustrates an example computing device 1100, in accordance with at least one embodiment. In some embodiments, the computing device 1100 is used to implement one or more of the systems and components discussed herein. Further, the computing device 1100 may interact with any of the systems and components described herein. Accordingly, the computing device 1100 may be used to perform various procedures and tasks, such as those discussed herein. The computing device 1100 can function as a server, a client, or any other computing entity. The computing device 1100 can be any of a wide variety of computing devices, such as a desktop computer, a notebook computer, a server computer, a handheld computer, a mobile device, a tablet, and/or the like.

In the depicted embodiment, the computing device 1100 includes one or more processor(s) 1102, one or more memory device(s) 1104, one or more interface(s) 1106, one or more mass storage device(s) 1108, and one or more input/output device(s) 1110, all of which are coupled to a bus 1114. The processor(s) 1102 include one or more processors or controllers that execute instructions stored in the memory device(s) 1104 and/or the mass storage device(s) 1108.

The memory device(s) 1104 can include various computer-storage media, such as volatile memory (e.g., random access memory (RAM)) and/or nonvolatile memory (e.g., read-only memory (ROM)). The memory device(s) 1104 may also include rewritable ROM, such as Flash memory. The processor(s) 1102 may also include various types of computer-storage media, such as cache memory.

The interface(s) 1106 may include various interfaces that allow the computing device 1100 to interact with other systems, devices, computing environments, and/or the like. Example interface(s) 1106 include any number of different network interfaces, such as interfaces to local area networks (LANs), wide area networks (WANs), wireless networks, the Internet, and/or the like.

The mass storage device(s) 1108 may include various computer-storage media, such as magnetic tapes, magnetic disks, optical disks, solid-state memory (e.g., Flash memory), and so forth. Various drives may also be included in the mass storage device(s) 1108 to enable reading from and/or writing to the various computer-storage media. The mass storage device(s) 1108 may include removable media and/or non-removable media.

The input/output device(s) 1110 may include various devices that allow data and/or other information to be input to and/or retrieved from the computing device 1100. Example input/output device(s) 1110 include cursor-control devices, keyboards, keypads, microphones, monitors or other display devices, speakers, printers, network interface cards, modems, lenses, CCDs or other image-capture devices, and the like.

The bus 1114 allows the processor(s) 1102, the memory device(s) 1104, the interface(s) 1106, the mass storage device(s) 1108, and the input/output device(s) 1110 to communicate with one another, as well as with other devices or components that may be coupled to the bus 1114. The bus 1114 represents one or more of several types of bus structures, such as a system bus, a PCI bus, an IEEE 1394 bus, a USB bus, and/or the like. In some examples, the bus 1114 includes one or more network connections.

For purposes of illustration, programs and other executable program components are shown herein as discrete blocks, although it is understood that such programs and components may reside at various times in different storage components of the computing device 1100 and are executed by the processor(s) 1102. Alternatively, the systems and procedures described herein can be implemented in hardware, or using a combination of hardware and software and/or firmware. For example, one or more application specific integrated circuits (ASICs) can be programmed to carry out one or more of the systems and procedures described herein.

The various memories may store one or more sets of instructions 1112 and data structures (e.g., software) embodying or utilized by any one or more of the methodologies or functions described herein. These instructions 1112, when executed by the processor(s) 1102, cause various operations to implement the disclosed embodiments.

As used herein, the terms "computer-storage medium (and media)," "machine-storage medium (and media)," and "device-storage medium (and media)" mean the same thing and may be used interchangeably in this disclosure. The terms refer to a single storage device or multiple storage devices and/or media (e.g., a centralized or distributed database, and/or associated caches and servers) that store executable instructions and/or data. The terms shall accordingly be taken to include, but not be limited to, solid-state memories as well as optical and magnetic media, including memory internal or external to processors. Specific examples of computer-storage media, machine-storage media, and/or device-storage media include non-volatile memory, include by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "computer-storage medium (and media)," "machine-storage medium (and media)," and "device-storage medium (and media)" specifically exclude carrier waves, modulated data signals, and other such media, at least some of which are covered under the term "transmission medium (and media)" discussed below.

In various example embodiments, any network or portion of a network described herein may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi network, another type of network, or a combination of two or more such networks. For example, any network or portion of a network described herein may include a wireless or cellular network, and a utilized coupling may be a Code Division Multiple Access (CDMA) connection, a Global System for Mobile communications (GSM) connection, or another type of cellular or wireless coupling. In this example, a coupling may implement any of a variety of types of data-transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, and/or other data-transfer technology.

The instructions 1112 may be transmitted or received over a network using a transmission medium via a network interface device (e.g., a network interface component) and utilizing any one of a number of well-known transfer protocols (e.g., hypertext transfer protocol (HTTP)). Similarly, the instructions 1112 may be transmitted or received using a transmission medium via a coupling (e.g., a peer-to-peer coupling) to one or more devices. The terms "transmission medium (and media)" and "signal medium (and media)" mean the same thing and may be used interchangeably in this disclosure. The terms "transmission medium (and media)" and "signal medium (and media)" shall be taken to include any intangible medium that is capable of storing, encoding, or carrying the instructions 1112 for execution by the computing device 1100, and include digital or analog communications signals or other intangible media to facilitate communication of such software. Hence, the terms "transmission medium (and media)" and "signal medium (and media)" shall be taken to include any form of modulated data signal, carrier wave, and so forth. The term "modulated data signal" means a signal that has one or more of its characteristics set or changed in such a manner as to encode information in the signal.

The terms "computer-readable medium (and media)," "machine-readable medium (and media)," and "device-readable medium (and media)" mean the same thing and may be used interchangeably in this disclosure. The terms are defined to include both computer-storage media and transmission media. Thus, the terms include both storage devices and storage media as well as carrier waves and modulated data signals.

In view of the disclosure above, various examples are set forth below. It should be noted that one or more features of an example, taken in isolation or combination, should be considered within the disclosure of this application.

Example 1 is a method performed by a data platform executing instructions on at least one hardware processor, the method including: provisioning a remote-deployment account of a data provider at a remote deployment of the data platform with a set of one or more replication-preparation objects associated with a primary-deployment database that is resident in a primary-deployment account of the data provider at a primary deployment of the data platform; detecting receipt, after the provisioning, of a database-replication request associated with a data consumer, the database-replication request requesting availability to the data consumer of a local instance of the primary-deployment database in the remote-deployment account of the data provider at the remote deployment of the data platform; and performing one or more remote-deployment-activation operations in response to detecting receipt of the database-replication request, the performing of the one or more remote-deployment-activation operations making available to the data consumer a local instance of the primary-deployment database in the remote-deployment account of the data provider at the remote deployment of the data platform.

Example 2 is the method of Example 1, where detecting receipt of the database-replication request associated with the data consumer includes detecting receipt of the database-replication request at the remote-deployment account of the data provider.

Example 3 is the method of Example 2, further including monitoring the remote-deployment account for database-replication requests.

Example 4 is the method of Example 3, where: the set of one or more replication-preparation objects associated with the primary-deployment database includes a remote-deployment task that performs the monitoring of the remote-deployment account for database-replication requests; and the remote-deployment task also performs the detecting of the receipt at the remote-deployment account of the database-replication request.

Example 5 is the method of any of the Examples 1-4, where the set of one or more replication-preparation objects associated with the primary-deployment database includes a database shell of a remote-deployment database corresponding to the primary-deployment database.

Example 6 is the method of Example 5, where the one or more remote-deployment-activation operations includes invoking a database-refresh operation that initiates pushing of database data from the primary-deployment database to the database shell.

Example 7 is the method of Example 6, where: the pushing of the database data from the primary-deployment database to the database shell modifies the database shell into a remote-deployment database that is resident in the remote-deployment account of the data provider at the remote deployment of the data platform; and the remote-deployment database includes a local instance of the primary-deployment database in the remote-deployment account of the data provider at the remote deployment of the data platform.

Example 8 is the method of Example 7, where the set of one or more replication-preparation objects associated with the primary-deployment database further includes a share shell that is configured as an access control with respect to the remote-deployment database.

Example 9 is the method of Example 8, where the one or more remote-deployment-activation operations further includes invoking a share-refresh operation that provides the data consumer with access to the remote-deployment database in the remote-deployment account of the data provider at the remote deployment of the data platform.

Example 10 is the method of Example 9, where the share-refresh operation provides the data consumer with access to the remote-deployment database in the remote-deployment account of the data provider at the remote deployment of the data platform at least in part by: initiating pushing of share data from a primary-deployment share to the share shell, the pushing of share data modifying the share shell into a remote-deployment share that is resident in the remote-deployment account of the data provider at the remote deployment of the data platform, the remote-deployment share providing the data consumer with access to the remote-deployment database.

Example 11 is a data platform including: at least one hardware processor; and one or more computer-storage media containing instructions that, when executed by the at least one hardware processor, cause the data platform to perform operations including: provisioning a remote-deployment account of a data provider at a remote deployment of the data platform with a set of one or more replication-preparation objects associated with a primary-deployment database that is resident in a primary-deployment account of the data provider at a primary deployment of the data platform; detecting receipt, after the provisioning, of a database-replication request associated with a data consumer, the database-replication request requesting availability to the data consumer of a local instance of the primary-deployment database in the remote-deployment account of the data provider at the remote deployment of the data platform; and performing one or more remote-deployment-activation operations in response to detecting receipt of the database-replication request, the performing of the one or more remote-deployment-activation operations making available to the data consumer a local instance of the primary-deployment database in the remote-deployment account of the data provider at the remote deployment of the data platform.

Example 12 is the data platform of Example 11, where detecting receipt of the database-replication request associated with the data consumer includes detecting receipt of the database-replication request at the remote-deployment account of the data provider.

Example 13 is the data platform of Example 12, the operations further including monitoring the remote-deployment account for database-replication requests.

Example 14 is the data platform of Example 13, where: the set of one or more replication-preparation objects associated with the primary-deployment database includes a remote-deployment task that performs the monitoring of the remote-deployment account for database-replication requests; and the remote-deployment task also performs the detecting of the receipt at the remote-deployment account of the database-replication request.

Example 15 is the data platform of any of the Examples 11-14, where the set of one or more replication-preparation objects associated with the primary-deployment database includes a database shell of a remote-deployment database corresponding to the primary-deployment database.

Example 16 is the data platform of Example 15, where the one or more remote-deployment-activation operations includes invoking a database-refresh operation that initiates pushing of database data from the primary-deployment database to the database shell.

Example 17 is the data platform of Example 16, where: the pushing of the database data from the primary-deployment database to the database shell modifies the database shell into a remote-deployment database that is resident in the remote-deployment account of the data provider at the remote deployment of the data platform; and the remote-deployment database includes a local instance of the primary-deployment database in the remote-deployment account of the data provider at the remote deployment of the data platform.

Example 18 is the data platform of Example 17, where the set of one or more replication-preparation objects associated with the primary-deployment database further includes a share shell that is configured as an access control with respect to the remote-deployment database.

Example 19 is the data platform of Example 18, where the one or more remote-deployment-activation operations further includes invoking a share-refresh operation that provides the data consumer with access to the remote-deployment database in the remote-deployment account of the data provider at the remote deployment of the data platform.

Example 20 is the data platform of Example 19, where the share-refresh operation provides the data consumer with access to the remote-deployment database in the remote-deployment account of the data provider at the remote deployment of the data platform at least in part by: initiating pushing of share data from a primary-deployment share to the share shell, the pushing of share data modifying the share shell into a remote-deployment share that is resident in the remote-deployment account of the data provider at the remote deployment of the data platform, the remote-deployment share providing the data consumer with access to the remote-deployment database.

Example 21 is one or more computer-storage media containing instructions that, when executed by at least one hardware processor of a data platform, cause the at least one hardware processor to perform operations including: provisioning a remote-deployment account of a data provider at a remote deployment of the data platform with a set of one or more replication-preparation objects associated with a primary-deployment database that is resident in a primary-deployment account of the data provider at a primary deployment of the data platform; detecting receipt, after the provisioning, of a database-replication request associated with a data consumer, the database-replication request requesting availability to the data consumer of a local instance of the primary-deployment database in the remote-deployment account of the data provider at the remote deployment of the data platform; and performing one or more remote-deployment-activation operations in response to detecting receipt of the database-replication request, the performing of the one or more remote-deployment-activation operations making available to the data consumer a local instance of the primary-deployment database in the remote-deployment account of the data provider at the remote deployment of the data platform.

Example 22 is the one or more computer-storage media of Example 21, where detecting receipt of the database-replication request associated with the data consumer includes detecting receipt of the database-replication request at the remote-deployment account of the data provider.

Example 23 is the one or more computer-storage media of Example 22, where: the operations further include monitoring the remote-deployment account for database-replication requests; the set of one or more replication-preparation objects associated with the primary-deployment database includes a remote-deployment task that performs the monitoring of the remote-deployment account for database-replication requests; and the remote-deployment task also performs the detecting of the receipt at the remote-deployment account of the database-replication request.

Example 24 is the one or more computer-storage media of any of the Examples 21-23, where: the set of one or more replication-preparation objects associated with the primary-deployment database includes a database shell of a remote-deployment database corresponding to the primary-deployment database; the one or more remote-deployment-activation operations includes invoking a database-refresh operation that initiates pushing of database data from the primary-deployment database to the database shell; the pushing of the database data from the primary-deployment database to the database shell modifies the database shell into a remote-deployment database that is resident in the remote-deployment account of the data provider at the remote deployment of the data platform; and the remote-deployment database includes a local instance of the primary-deployment database in the remote-deployment account of the data provider at the remote deployment of the data platform.

Example 25 is the one or more computer-storage media of Example 24, where: the set of one or more replication-preparation objects associated with the primary-deployment database further includes a share shell that is configured as an access control with respect to the remote-deployment database; and the one or more remote-deployment-activation operations further includes invoking a share-refresh operation that provides the data consumer with access to the remote-deployment database in the remote-deployment account of the data provider at the remote deployment of the data platform; and the share-refresh operation provides the data consumer with access to the remote-deployment database in the remote-deployment account of the data provider at the remote deployment of the data platform at least in part by: initiating pushing of share data from a primary-deployment share to the share shell, the pushing of share data modifying the share shell into a remote-deployment share that is resident in the remote-deployment account of the data provider at the remote deployment of the data platform, the remote-deployment share providing the data consumer with access to the remote-deployment database.

Example 31 is a method performed by a data platform executing instructions on at least one hardware processor, the method including: detecting receipt of a database-replication request associated with a data consumer, the database-replication request requesting availability to the data consumer of a local instance of a primary-deployment database in a remote-deployment account of a data provider at a remote deployment of the data platform, the primary-deployment database being resident in a primary-deployment account of the data provider at a primary deployment of the data platform; and performing, in response to detecting receipt of the database-replication request, remote-deployment-activation operations including: provisioning the remote-deployment account with a set of one or more replication-preparation objects associated with the primary-deployment database; and invoking at least one refresh command with respect to the set of one or more replication-preparation objects, the invoking of the at least one refresh command making available to the data consumer a local instance of the primary-deployment database in the remote-deployment account of the data provider at the remote deployment of the data platform.

Example 32 is the method of Example 31, where detecting receipt of the database-replication request associated with the data consumer includes detecting receipt of the database-replication request at the primary-deployment account of the data provider.

Example 33 is the method of Example 32, further including monitoring the primary-deployment account for database-replication requests.

Example 34 is the method of Example 33, where: a monitoring task monitors the primary-deployment account for database-replication requests; and the monitoring task also performs the detecting of the receipt at the primary-deployment account of the database-replication request.

Example 35 is the method of any of the Examples 31-34, where the set of one or more replication-preparation objects associated with the primary-deployment database includes a database shell of a remote-deployment database corresponding to the primary-deployment database.

Example 36 is the method of Example 35, where the at least one refresh command includes a database-refresh operation that initiates pushing of database data from the primary-deployment database to the database shell.

Example 37 is the method of Example 36, where: the pushing of the database data from the primary-deployment database to the database shell modifies the database shell into a remote-deployment database that is resident in the remote-deployment account of the data provider at the remote deployment of the data platform; and the remote-deployment database includes a local instance of the primary-deployment database in the remote-deployment account of the data provider at the remote deployment of the data platform.

Example 38 is the method of Example 37, where the set of one or more replication-preparation objects associated with the primary-deployment database further includes a share shell that is configured as an access control with respect to the remote-deployment database.

Example 39 is the method of Example 38, where the at least one refresh command further includes a share-refresh operation that provides the data consumer with access to the remote-deployment database in the remote-deployment account of the data provider at the remote deployment of the data platform.

Example 40 is the method of Example 39, where the share-refresh operation provides the data consumer with access to the remote-deployment database in the remote-deployment account of the data provider at the remote deployment of the data platform at least in part by: initiating pushing of share data from a primary-deployment share to the share shell, the pushing of share data modifying the share shell into a remote-deployment share that is resident in the remote-deployment account of the data provider at the remote deployment of the data platform, the remote-deployment share providing the data consumer with access to the remote-deployment database.

Example 41 is a data platform including: at least one hardware processor; and one or more computer-storage media containing instructions that, when executed by the at least one hardware processor, cause the data platform to perform operations including: detecting receipt of a database-replication request associated with a data consumer, the database-replication request requesting availability to the data consumer of a local instance of a primary-deployment database in a remote-deployment account of a data provider at a remote deployment of the data platform, the primary-deployment database being resident in a primary-deployment account of the data provider at a primary deployment of the data platform; and performing, in response to detecting receipt of the database-replication request, one or more remote-deployment-activation operations including: provisioning the remote-deployment account with a set of one or more replication-preparation objects associated with the primary-deployment database; and invoking at least one refresh command with respect to the set of one or more replication-preparation objects, the invoking of the at least one refresh command making available to the data consumer a local instance of the primary-deployment database in the remote-deployment account of the data provider at the remote deployment of the data platform.

Example 42 is the data platform of Example 41, where detecting receipt of the database-replication request associated with the data consumer includes detecting receipt of the database-replication request at the primary-deployment account of the data provider.

Example 43 is the data platform of Example 42, the operations further including monitoring the primary-deployment account for database-replication requests.

Example 44 is the data platform of Example 43, where: a monitoring task monitors the primary-deployment account for database-replication requests; and the monitoring task also performs the detecting of the receipt at the primary-deployment account of the database-replication request.

Example 45 is the data platform of Example 41, where the set of one or more replication-preparation objects associated with the primary-deployment database includes a database shell of a remote-deployment database corresponding to the primary-deployment database.

Example 46 is the data platform of Example 45, where the at least one refresh command includes a database-refresh operation that initiates pushing of database data from the primary-deployment database to the database shell.

Example 47 is the data platform of Example 46, where: the pushing of the database data from the primary-deployment database to the database shell modifies the database shell into a remote-deployment database that is resident in the remote-deployment account of the data provider at the remote deployment of the data platform; and the remote-deployment database includes a local instance of the primary-deployment database in the remote-deployment account of the data provider at the remote deployment of the data platform.

Example 48 is the data platform of Example 47, where the set of one or more replication-preparation objects associated with the primary-deployment database further includes a share shell that is configured as an access control with respect to the remote-deployment database.

Example 49 is the data platform of Example 48, where the at least one refresh command further includes a share-refresh operation that provides the data consumer with access to the remote-deployment database in the remote-deployment account of the data provider at the remote deployment of the data platform.

Example 50 is the data platform of Example 49, where the share-refresh operation provides the data consumer with access to the remote-deployment database in the remote-deployment account of the data provider at the remote deployment of the data platform at least in part by: initiating pushing of share data from a primary-deployment share to the share shell, the pushing of share data modifying the share shell into a remote-deployment share that is resident in the remote-deployment account of the data provider at the remote deployment of the data platform, the remote-deployment share providing the data consumer with access to the remote-deployment database.

Example 51 is one or more computer-storage media containing instructions that, when executed by at least one hardware processor of a data platform, cause the at least one hardware processor to perform operations including: detecting receipt of a database-replication request associated with a data consumer, the database-replication request requesting availability to the data consumer of a local instance of a primary-deployment database in a remote-deployment account of a data provider at a remote deployment of the data platform, the primary-deployment database being resident in a primary-deployment account of the data provider at a primary deployment of the data platform; and performing, in response to detecting receipt of the database-replication request, one or more remote-deployment-activation operations including: provisioning the remote-deployment account with a set of one or more replication-preparation objects associated with the primary-deployment database; and invoking at least one refresh command with respect to the set of one or more replication-preparation objects, the invoking of the at least one refresh command making available to the data consumer a local instance of the primary-deployment database in the remote-deployment account of the data provider at the remote deployment of the data platform.

Example 52 is the one or more computer-storage media of Example 51, where detecting receipt of the database-replication request associated with the data consumer includes detecting receipt of the database-replication request at the primary-deployment account of the data provider.

Example 53 is the one or more computer-storage media of Example 52, where: the operations further include monitoring the primary-deployment account for database-replication requests; a monitoring task monitors the primary-deployment account for database-replication requests; and the monitoring task also performs the detecting of the receipt at the primary-deployment account of the database-replication request.

Example 54 is the one or more computer-storage media of any of the Examples 51-53, where: the set of one or more replication-preparation objects associated with the primary-deployment database includes a database shell of a remote-deployment database corresponding to the primary-deployment database; the at least one refresh command includes a database-refresh operation that initiates pushing of database data from the primary-deployment database to the database shell; the pushing of the database data from the primary-deployment database to the database shell modifies the database shell into a remote-deployment database that is resident in the remote-deployment account of the data provider at the remote deployment of the data platform; and the remote-deployment database includes a local instance of the primary-deployment database in the remote-deployment account of the data provider at the remote deployment of the data platform.

Example 55 is the one or more computer-storage media of Example 54, where: the set of one or more replication-preparation objects associated with the primary-deployment database further includes a share shell that is configured as an access control with respect to the remote-deployment database; the at least one refresh command further includes a share-refresh operation that provides the data consumer with access to the remote-deployment database in the remote-deployment account of the data provider at the remote deployment of the data platform; and the share-refresh operation provides the data consumer with access to the remote-deployment database in the remote-deployment account of the data provider at the remote deployment of the data platform at least in part by: initiating pushing of share data from a primary-deployment share to the share shell, the pushing of share data modifying the share shell into a remote-deployment share that is resident in the remote-deployment account of the data provider at the remote deployment of the data platform, the remote-deployment share providing the data consumer with access to the remote-deployment database.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

U.S. patent application Ser. No. 16/994,325, filed Aug. 14, 2020 and entitled "Data Exchange Availability, Listing Availability, and Listing Fulfillment," is hereby incorporated herein by reference in its entirety.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

In the present disclosure, various terminology is used in accordance with provided definitions. Furthermore, it is noted in connection with the definitions set out herein that the defined terms and phrases as used herein include the provided definitions along with any general and conventional understandings of the meaning of the respective terms and phrases.

It is further noted that, as used in this specification and in the appended claims, the singular forms "a," "an," and "the" include plural referents unless the context clearly dictates otherwise.

As used herein, the terms "comprising," "including," "containing," "characterized by," and grammatical equivalents thereof are inclusive, open-ended terms that do not exclude additional, unrecited elements, method steps, or the like.

Many of the functional units described in this specification may be implemented as one or more components, which is a term used to more particularly emphasize their implementation independence. For example, a component may be implemented as a hardware circuit including custom very large-scale integration (VLSI) circuits or gate arrays, off-the-shelf semiconductors such as logic chips, transistors, and/or other discrete components. A component may also be implemented in programmable hardware devices such as field programmable gate arrays (FPGAs), programmable array logic, programmable logic devices, and/or the like.

Components may also be implemented in software for execution on various types of hardware (e.g., by various types of processors). An identified component of executable code may, for instance, include one or more physical or logical blocks of computer instructions, which may, for instance, be organized as an object, a procedure, or a function. Nevertheless, the executable instructions of an identified component need not be physically located together but may include disparate instructions stored in different locations that, when joined logically together, make up the component and achieve the stated purpose for the component.

Indeed, a component of executable code may be a single instruction, or many instructions, and may be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the claims.

What is claimed is:

1. A method performed by a data platform executing instructions on at least one hardware processor, the method comprising:
    detecting receipt of a database-replication request associated with a data consumer, the database-replication request requesting availability to the data consumer of a local instance of a primary-deployment database in a remote-deployment account of a data provider at a remote deployment of the data platform, the primary-deployment database being resident in a primary-deployment account of the data provider at a primary deployment of the data platform; and
    performing, in response to detecting receipt of the database-replication request, remote-deployment-activation operations including:
        provisioning the remote-deployment account with a set of one or more replication-preparation objects associated with the primary-deployment database,
            the set of one or more replication-preparation objects comprising a share shell that is configured as an access control with respect to a remote-deployment database,
            the remote-deployment database comprising the requested local instance of the primary-deployment database in the remote-deployment account of the data provider at the remote deployment of the data platform; and
        invoking at least one refresh command with respect to the set of one or more replication-preparation objects, the invoking of the at least one refresh command making the remote-deployment database available to the data consumer in the remote-deployment account of the data provider at the remote deployment of the data platform.

2. The method of claim 1, wherein detecting receipt of the database-replication request associated with the data consumer comprises detecting receipt of the database-replication request at the primary-deployment account of the data provider.

3. The method of claim 2, further comprising monitoring the primary-deployment account for database-replication requests.

4. The method of claim 3, wherein:
    a monitoring task monitors the primary-deployment account for database-replication requests; and
    the monitoring task also performs the detecting of the receipt at the primary-deployment account of the database-replication request.

5. The method of claim 1, wherein the set of one or more replication-preparation objects further comprises a database shell of the remote-deployment database.

6. The method of claim 5, wherein the at least one refresh command comprises a database-refresh operation that initiates pushing of database data from the primary-deployment database to the database shell.

7. The method of claim 6, wherein the pushing of the database data from the primary-deployment database to the database shell converts the database shell into the remote-deployment database.

8. The method of claim 1, wherein the at least one refresh command comprises a share-refresh operation that modifies the share shell to provide the data consumer with access to the remote-deployment database.

9. The method of claim 8, wherein the share-refresh operation initiates pushing of share data from a primary-deployment share to the share shell, the pushing of the share data converting the share shell into a remote-deployment share that is resident in the remote-deployment account of the data provider at the remote deployment of the data platform, the remote-deployment share providing the data consumer with access to the remote-deployment database.

10. A data platform comprising:
    at least one hardware processor; and
    one or more computer-storage media containing instructions that, when executed by the at least one hardware processor, cause the data platform to perform operations including:
        detecting receipt of a database-replication request associated with a data consumer, the database-replication request requesting availability to the data consumer of a local instance of a primary-deployment database in a remote-deployment account of a data provider at a remote deployment of the data platform, the primary-deployment database being resident in a primary-deployment account of the data provider at a primary deployment of the data platform; and
        performing, in response to detecting receipt of the database-replication request, one or more remote-deployment-activation operations including:
            provisioning the remote-deployment account with a set of one or more replication-preparation objects associated with the primary-deployment database,
                the set of one or more replication-preparation objects comprising a share shell that is configured as an access control with respect to a remote-deployment database,
the remote-deployment database comprising the requested local instance of the primary-deployment database in the remote-deployment account of the data provider at the remote deployment of the data platform; and
invoking at least one refresh command with respect to the set of one or more replication-preparation objects, the invoking of the at least one refresh command making the remote-deployment database available to the data consumer in the remote-deployment account of the data provider at the remote deployment of the data platform.

11. The data platform of claim 10, wherein detecting receipt of the database-replication request associated with the data consumer comprises detecting receipt of the database-replication request at the primary-deployment account of the data provider.

12. The data platform of claim 11, the operations further comprising monitoring the primary-deployment account for database-replication requests.

13. The data platform of claim 12, wherein:
a monitoring task monitors the primary-deployment account for database-replication requests; and
the monitoring task also performs the detecting of the receipt at the primary-deployment account of the database-replication request.

14. The data platform of claim 10, wherein the set of one or more replication-preparation objects further comprises a database shell of the remote-deployment database.

15. The data platform of claim 14, wherein the at least one refresh command comprises a database-refresh operation that initiates pushing of database data from the primary-deployment database to the database shell.

16. The data platform of claim 15, wherein the pushing of the database data from the primary-deployment database to the database shell converts the database shell into the remote-deployment database.

17. The data platform of claim 10, wherein the at least one refresh command comprises a share-refresh operation that modifies the share shell to provide the data consumer with access to the remote-deployment database.

18. The data platform of claim 17, wherein the share-refresh operation initiates pushing of share data from a primary-deployment share to the share shell, the pushing of the share data converting the share shell into a remote-deployment share that is resident in the remote-deployment account of the data provider at the remote deployment of the data platform, the remote-deployment share providing the data consumer with access to the remote-deployment database.

19. One or more computer-storage media containing instructions that, when executed by at least one hardware processor of a data platform, cause the at least one hardware processor to perform operations including:
detecting receipt of a database-replication request associated with a data consumer, the database-replication request requesting availability to the data consumer of a local instance of a primary-deployment database in a remote-deployment account of a data provider at a remote deployment of the data platform, the primary-deployment database being resident in a primary-deployment account of the data provider at a primary deployment of the data platform; and
performing, in response to detecting receipt of the database-replication request, one or more remote-deployment-activation operations including:
provisioning the remote-deployment account with a set of one or more replication-preparation objects associated with the primary-deployment database,
the set of one or more replication-preparation objects comprising a share shell that is configured as an access control with respect to a remote-deployment database,
the remote-deployment database comprising the requested local instance of the primary-deployment database in the remote-deployment account of the data provider at the remote deployment of the data platform; and
invoking at least one refresh command with respect to the set of one or more replication-preparation objects, the invoking of the at least one refresh command making the remote-deployment database available to the data consumer in the remote-deployment account of the data provider at the remote deployment of the data platform.

20. The one or more computer-storage media of claim 19, wherein detecting receipt of the database-replication request associated with the data consumer comprises detecting receipt of the database-replication request at the primary-deployment account of the data provider.

21. The one or more computer-storage media of claim 20, wherein:
the operations further comprise monitoring the primary-deployment account for database-replication requests;
a monitoring task monitors the primary-deployment account for database-replication requests; and
the monitoring task also performs the detecting of the receipt at the primary-deployment account of the database-replication request.

22. The one or more computer-storage media of claim 19, wherein:
the set of one or more replication-preparation objects further comprises a database shell of the remote-deployment database;
the at least one refresh command comprises a database-refresh operation that initiates pushing of database data from the primary-deployment database to the database shell; and
the pushing of the database data from the primary-deployment database to the database shell converts the database shell into the remote-deployment database.

23. The one or more computer-storage media of claim 22, wherein:
the at least one refresh command comprises a share-refresh operation that modifies the share shell to provide the data consumer with access to the remote-deployment database; and
the share-refresh operation initiates pushing of share data from a primary-deployment share to the share shell, the pushing of the share data converting the share shell into a remote-deployment share that is resident in the remote-deployment account of the data provider at the remote deployment of the data platform, the remote-deployment share providing the data consumer with access to the remote-deployment database.

* * * * *